US007942040B2

(12) United States Patent
Kaneko et al.

(10) Patent No.: US 7,942,040 B2
(45) Date of Patent: May 17, 2011

(54) KNOCKING DETERMINATION DEVICE AND METHOD FOR INTERNAL COMBUSTION ENGINE

(75) Inventors: Rihito Kaneko, Nishikamo-gun (JP);
Kenji Kasashima, Nishikamo-gun (JP);
Masatomo Yoshihara, Toyota (JP);
Kenji Senda, Okazaki (JP); Yuuichi Takemura, Anjo (JP); Shuhei Oe, Kariya (JP)

(73) Assignees: Toyota Jidosha Kabushiki Kaisha, Toyota-shi (JP); Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 238 days.

(21) Appl. No.: 12/162,489

(22) PCT Filed: May 21, 2007

(86) PCT No.: PCT/JP2007/060748
§ 371 (c)(1),
(2), (4) Date: Jul. 29, 2008

(87) PCT Pub. No.: WO2007/139042
PCT Pub. Date: Dec. 6, 2007

(65) Prior Publication Data
US 2009/0038384 A1   Feb. 12, 2009

(30) Foreign Application Priority Data

May 29, 2006  (JP) .................................. 2006-148523

(51) Int. Cl.
*G01M 15/12* (2006.01)
(52) U.S. Cl. ..................... 73/114.07; 73/35.01; 73/35.09

(58) Field of Classification Search ................. 73/35.01, 73/35.09, 114.07
See application file for complete search history.

(56) References Cited

U.S. PATENT DOCUMENTS

| 6,546,328 | B1 * | 4/2003 | Slicker ........................ 701/111 |
| 6,688,286 | B2 * | 2/2004 | Kokubo et al. .......... 123/406.33 |
| 6,701,894 | B2 * | 3/2004 | Katagami ................ 123/406.33 |
| 7,263,430 | B2 * | 8/2007 | Kasashima et al. ........... 701/111 |
| 7,281,516 | B2 * | 10/2007 | Kaneko et al. ........... 123/406.38 |
| 7,387,107 | B2 * | 6/2008 | Kaneko et al. ........... 123/406.21 |
| 7,392,788 | B2 * | 7/2008 | Kaneko et al. ........... 123/406.29 |
| 7,441,543 | B2 * | 10/2008 | Yoshihara et al. ....... 123/406.38 |
| 7,500,468 | B2 * | 3/2009 | Kaneko et al. ........... 123/406.29 |
| 7,588,015 | B2 * | 9/2009 | Kaneko et al. ........... 123/406.21 |
| 7,594,423 | B2 * | 9/2009 | Padhi et al. ................. 73/35.09 |
| 7,669,459 | B2 * | 3/2010 | Yoshihara et al. ........... 73/35.06 |

(Continued)

FOREIGN PATENT DOCUMENTS

JP          4 76249         3/1992
(Continued)

*Primary Examiner* — Freddie Kirkland, III
(74) *Attorney, Agent, or Firm* — Oblon, Spivak, McClelland, Maier & Neustadt, L.L.P.

(57) ABSTRACT

Out of synthesized waveforms of vibrations in a first frequency band A to a third frequency band C, a knock magnitude N is calculated by using a portion β having an integrated value greater than a reference magnitude in a knock region but not using a portion having an integrated value greater than the reference magnitude out of the knock region (i.e., a region obtained by excluding the knock region from a knock detecting gate). In a case where knock magnitude N is greater than a determination value V(KX), it is determined that knocking occurs. In contrast, in a case where knock magnitude N is not greater than determination value V(KX), it is determined that no knocking occurs.

16 Claims, 23 Drawing Sheets

U.S. PATENT DOCUMENTS

| | | | |
|---|---|---|---|
| 7,673,615 B2 * | 3/2010 | Oe et al. | 123/406.29 |
| 7,677,083 B2 * | 3/2010 | Oe et al. | 73/35.09 |
| 7,681,552 B2 * | 3/2010 | Kaneko et al. | 123/406.29 |
| 2005/0234633 A1 * | 10/2005 | Takemura et al. | 701/111 |
| 2005/0251320 A1 * | 11/2005 | Kasashima et al. | 701/111 |
| 2006/0185422 A1 * | 8/2006 | Iwade et al. | 73/35.09 |
| 2006/0236753 A1 * | 10/2006 | Yoshihara et al. | 73/35.09 |
| 2007/0084266 A1 * | 4/2007 | Kaneko et al. | 73/35.03 |
| 2009/0005956 A1 * | 1/2009 | Yoshihara et al. | 701/111 |
| 2009/0150058 A1 * | 6/2009 | Kaneko et al. | 701/111 |
| 2009/0158816 A1 * | 6/2009 | Kaneko et al. | 73/35.09 |

FOREIGN PATENT DOCUMENTS

| | | |
|---|---|---|
| JP | 5 26778 | 2/1993 |
| JP | 11-270400 | 10/1999 |
| JP | 11 324785 | 11/1999 |
| JP | 2003 21032 | 1/2003 |
| JP | 2004 353531 | 12/2004 |
| JP | 2005 23902 | 1/2005 |
| JP | 2005 330954 | 12/2005 |
| JP | 2006 307708 | 11/2006 |
| WO | WO 2007/004597 A1 | 1/2007 |

* cited by examiner

FIG. 9

|  | A | C | B |
|---|---|---|---|
| KL(2) | B | C | B |
| KL(1) | A | B | A |

INTAKE AIR AMOUNT KL

NE(1)　　NE(2)
ENGINE SPEED NE

KNOCKING DETERMINATION DEVICE AND METHOD FOR INTERNAL COMBUSTION ENGINE

TECHNICAL FIELD

The present invention relates to knocking determination device and method for an internal combustion engine, and more particularly to a technique for determining whether or not knocking occurs based on a waveform of vibration of an internal combustion engine.

BACKGROUND ART

There have been conventionally proposed various methods for determining whether or not knocking (knock) occurs. A knock controller for an internal combustion engine disclosed in Japanese Patent Laying-Open No. 2003-21032 includes: a knock sensor for detecting knocking in an internal combustion engine; a statistical processor for statistically processing an output signal detected by the knock sensor; a first temporary determiner for determining occurrence of knocking based on a result processed by the statistical processor; a second temporary determiner for determining occurrence of knocking based on a waveform of the output signal detected by the knock sensor; and a final knock determiner for finally determining occurrence of knocking based on the results of the knock temporary determination by the first temporary determiner and the knock temporary determination by the second temporary determiner. When both of the first and second temporary determiners determine that knocking occurs, the final knock determiner finally determines that the knocking occurs.

By the use of a knock temporary determination in accordance with a statistically processing program and a knock temporary determination in accordance with a waveform program, the knock controller disclosed in Japanese Patent Laying-Open No. 2003-21032 finally determines that the knocking occurs only when both of the temporary determinations result in that the knocking occurs. As a consequence, the occurrence of the knocking can be accurately determined in spite of an output signal resulting from the erroneous detection of the knocking by the knock determination by the use of only the statistically processing program or the waveform program.

Meanwhile, besides vibrations caused by the knocking, vibrations may be caused by the seating of an intake valve or an exhaust valve in the internal combustion engine. Otherwise, vibrations may be caused by actuation of an injector (in particular, a direct injector for directly injecting fuel into a cylinder) or a high-pressure pump for supplying fuel to an injector. When such vibrations are detected as noises together with the vibrations caused by the knocking, a waveform different from that during the knocking is detected irrespective of the occurrence of the knocking. Alternatively, a waveform similar to that during the knocking is detected even without any occurrence of the knocking. In this case, when the occurrence of the knocking is determined based on the waveform, like in the knock controller disclosed in Japanese Patent Laying-Open No. 2003-21032, it may be erroneously determined that no knocking occurs irrespective of the occurrence of the knocking, or to the contrary, it may be erroneously determined that the knocking occurs irrespective of no occurrence of the knocking.

DISCLOSURE OF THE INVENTION

An object of the present invention is to provide a knocking determination device and the like for an internal combustion engine, in which occurrence of knocking can be accurately determined.

A knocking determination device for an internal combustion engine according to an aspect of the present invention includes: a crank position sensor detecting a crank angle of the internal combustion engine; a knock sensor detecting the magnitude of vibration in the internal combustion engine in such a manner as to correspond to the crank angle; and an operation unit. The operation unit detects waveforms of vibrations at a predetermined first interval with respect to the crank angle and a second interval, at which the magnitude of vibration caused by knocking is smaller than that at the first interval, based on the magnitude of vibration in the internal combustion engine, removes a noise portion having a magnitude greater than a predetermined reference magnitude from the waveform at the second interval, and determines whether knocking occurs based on the waveform at the second interval, from which the noise portion is removed, and the waveform at the first interval.

With this configuration, the magnitude of vibration in the internal combustion engine is detected in such a manner as to correspond to the crank angle. The waveforms of the vibrations at the predetermined first interval with respect to the crank angle and the second interval, at which the magnitude of the vibration caused by the knocking is smaller than that at the first interval, are detected based on the magnitude of the vibration. These waveforms take peculiar forms at the time of the knocking in a case of the occurrence of the knocking. As a consequence, in reference to, for example, a waveform model created as the waveform of the vibration in a case of the occurrence of the knocking, it can be determined whether the knocking occurs in comparison between the waveform model and the obtained waveform. However, in the internal combustion engine, vibrations may occur caused by seating of an intake valve or an exhaust valve in addition to the vibration caused by the knocking. Otherwise, vibrations may occur caused by actuation of an injector (in particular, a direct injector for directly injecting fuel into a cylinder) or a high-pressure pump for supplying fuel into an injector. In a case where the vibration is detected as a noise together with the vibration caused by the knocking, a waveform different from that at the time of the knocking is detected irrespective of the occurrence of the knocking. Alternatively, a waveform similar to that at the time of the knocking is detected irrespective of no occurrence of the knocking. In a case where it is determined based on the waveform including the noise that the knocking occurs, it may be erroneously determined that no knocking occurs irrespective of the occurrence of the knocking or that the knocking occurs irrespective of no occurrence of the knocking. Since the magnitude of the vibration caused by knocking is smaller at the second interval than that at the first interval, the portion having the great magnitude in the waveform at the second interval is caused by the noise with a high possibility. In view of this, the noise portion having the magnitude greater than the predetermined reference magnitude is removed from the waveform at the second interval. Thus, it is possible to lessen an influence by the noise, so as to determine the occurrence of the knocking. As a consequence, it is possible to lessen erroneous determination that no knocking occurs irrespective of the occurrence of the knocking or that the knocking occurs irrespective of no occurrence of the knocking. In this manner, it is possible to provide the device for determining the knocking in the internal combustion engine, in which the occurrence of the knocking can be determined with high accuracy.

Preferably, the reference magnitude is a value which is calculated based on the predetermined number of magnitudes selected by priority of smaller ones out of the detected magnitudes.

With this configuration, the reference magnitude is calculated based on the predetermined number of magnitudes selected by priority of smaller ones. As a consequence, the reference magnitude can be calculated based on the magnitude which seems to be not the vibration caused by the knocking or the noise but mechanical vibration in the internal combustion engine per se. Therefore, it is possible to achieve the reference magnitude approximate to the mechanical vibration in the internal combustion engine per se. Thus, it is possible to accurately remove the vibration, which is not the mechanical vibration in the internal combustion engine per se, that is, the vibration caused by the noise by removing the portion having the magnitude greater than the reference magnitude.

Further preferably, the reference magnitude should be the value which is calculated as the average of the predetermined number of magnitudes selected by priority of smaller ones out of the detected magnitudes.

With this configuration, the reference magnitude is calculated as the average of the predetermined number of magnitudes selected by priority of smaller ones. As a consequence, the reference magnitude can be calculated as the average of the magnitudes which seem to be not the vibrations caused by the knocking or the noise but mechanical vibration in the internal combustion engine per se. Therefore, it is possible to achieve the reference magnitude approximate to the mechanical vibration in the internal combustion engine per se. Thus, it is possible to accurately remove the vibration, which is not the mechanical vibration in the internal combustion engine per se, that is, the vibration caused by the noise by removing the portion having the magnitude greater than the reference magnitude.

Further preferably, the operation unit determines whether there is a magnitude greater than a threshold calculated based on the reference magnitude, and then, determines whether the knocking occurs in a case where it is determined that there is a magnitude greater than the threshold.

With this configuration, it is determined whether there is the magnitude greater than the threshold to be calculated based on the reference magnitude. The knocking possibly occurs in a case where there is the magnitude greater than the threshold. As a consequence, only in a case where it is determined that there is the magnitude greater than the threshold, it is determined whether the knocking occurs. Therefore, it can be determined whether the knocking occurs in consideration of not only the waveform but also the magnitude. Thus, it is possible to lessen erroneous determination that the knocking occurs owing to the similarity of the waveform even the vibration which may not be caused by the knocking since the magnitude is small. As a result, it is possible to accurately determine the occurrence of the knocking.

Further preferably, the reference magnitude is calculated when it is determined whether there is the magnitude greater than the threshold.

With this configuration, the reference magnitude is calculated when it is determined whether there is the magnitude greater than the threshold. Thus, it is possible to determine whether the knocking occurs by using the reference magnitude according to an operation state at that time.

BRIEF DESCRIPTION OF THE DRAWINGS

FIG. 9 is a chart showing a map of a determination value V(KX) stored in the ROM or an SRAM in the engine ECU.

BEST MODES FOR CARRYING OUT THE INVENTION

Figure 1:
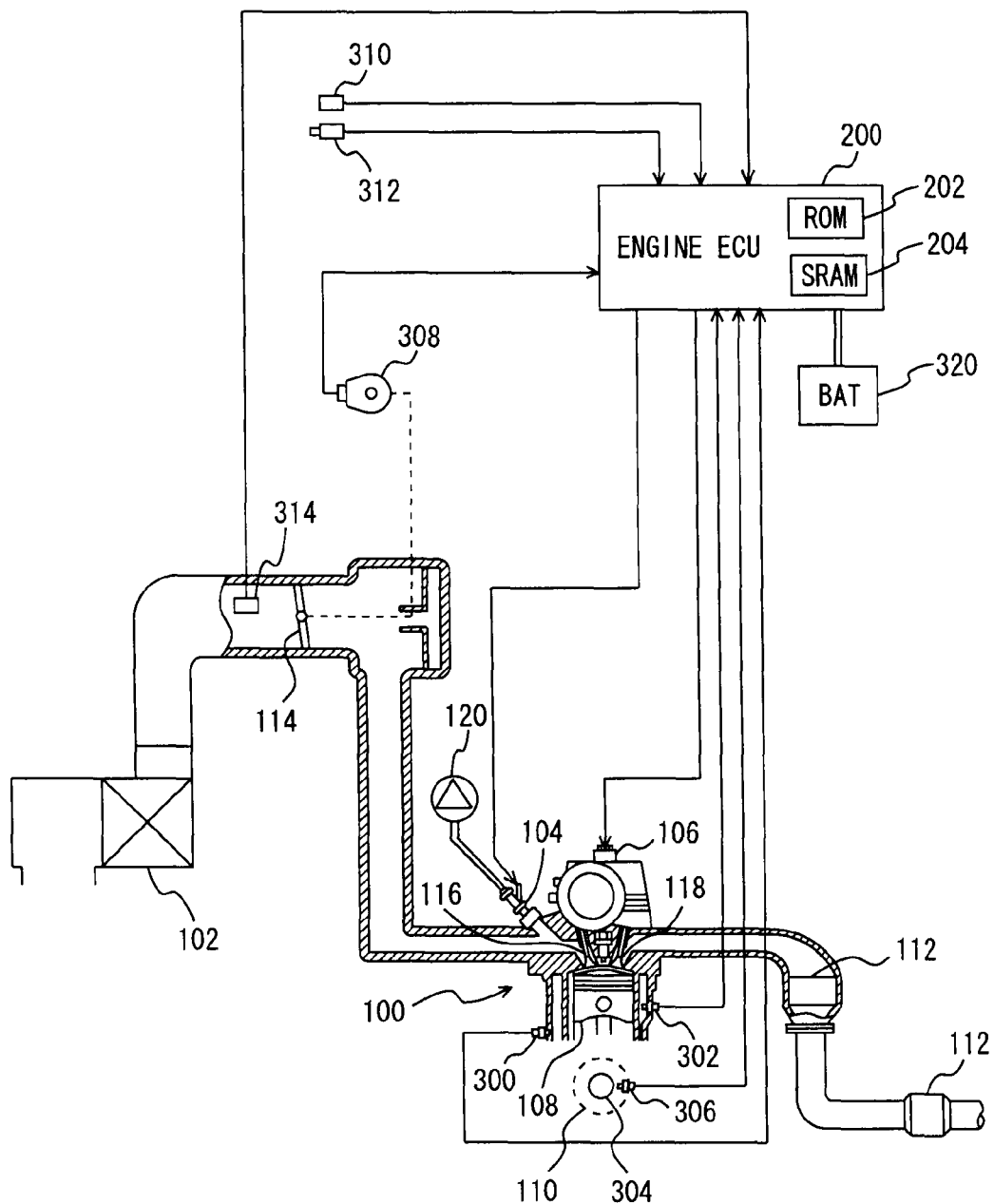
FIG. 1 is a diagram showing the schematic configuration of an engine to be controlled by an engine ECU serving as a knocking determination device in a preferred embodiment according to the present invention.

A preferred embodiment according to the present invention will be described below with reference to the attached drawings. Hereinafter, the same component parts are designated by the same reference numerals. They are identified by the same names and are equipped with the same functions. Therefore, detailed description thereon will not be repeated below.

With reference to FIG. 1, a description will be given of an engine 100 of a vehicle having a knocking determination device mounted thereon in a preferred embodiment according to the present invention. Engine 100 is provided with a plurality of cylinders. The knocking determination device in the present preferred embodiment is implemented in accordance with a program which is executed by, for example, an engine ECU (abbreviating an Electronic Control Unit) 200.

Engine 100 is an internal combustion engine in which an air-fuel mixture of air taken in from an air cleaner 102 and fuel injected from an injector 104 is ignited by a spark plug 106 and burnt in a combustion chamber. An ignition timing is controlled to take an MBT (abbreviating a Minimum advance for Best Torque) at which an output torque becomes maximum, but is retarded or advanced according to an operation state of engine 100 in a case of occurrence of knocking.

When the air-fuel mixture is burnt, a piston 108 is pushed down by a combustion pressure, thereby rotating a crankshaft 110. The air-fuel mixture after the combustion (i.e., exhaust gas) is purified by a ternary catalyst 112, and then, is exhausted to the outside of the vehicle. An amount of air taken into engine 100 is regulated by a throttle valve 114.

Engine 100 is controlled by engine ECU 200. To engine ECU 200 are connected a knock sensor 300, a water temperature sensor 302, a crank position sensor 306 provided to face a timing rotor 304, a throttle opening position sensor 308, a vehicle speed sensor 310, an ignition switch 312 and an air flow meter 314.

Knock sensor 300 is provided in a cylinder block of engine 100. Knock sensor 300 is formed of a piezoelectric element. Knock sensor 300 generates a voltage according to vibrations of engine 100. The magnitude of the voltage corresponds to the magnitude of the vibrations. Knock sensor 300 sends a signal representing the voltage to engine ECU 200. Water temperature sensor 302 detects a temperature of cooling water in a water jacket in engine 100, and then, sends a signal representing a detection result to engine ECU 200.

Timing rotor 304 is provided in crankshaft 110, and therefore, rotates together with crankshaft 110. On an outer periphery of timing rotor 304 are provided a plurality of protrusions at predetermined intervals. Crank position sensor 306 is provided in such a manner as to face the protrusion of timing rotor 304. When timing rotor 304 rotates, an air gap defined between the protrusion formed on timing rotor 304 and crank position sensor 306 changes. As a consequence, a magnetic flux passing through a coil of crank position sensor 306 increases or decreases, to thus generate an electromotive force in the coil. Crank position sensor 306 sends a signal representing the electromotive force to engine ECU 200. Engine ECU 200 detects a crank angle and the number of rotations of crankshaft 110 based on the signal sent from crank position sensor 306.

Throttle opening position sensor 308 detects an opening position of throttle, and then, sends a signal representing a detection result to engine ECU 200. Vehicle speed sensor 310 detects the number of rotations of a wheel (not shown), and then, sends a signal representing a detection result to engine ECU 200. Engine ECU 200 calculates a vehicle speed based on the number of rotations of the wheel. Ignition switch 312 is turned on by a driver in starting of engine 100. Air flow meter 314 detects the amount of air to be taken into engine 100, and then, sends a signal representing a detection result to engine ECU 200.

Engine ECU 200 is actuated by electric power supplied from an auxiliary battery 320 serving as a power supply. Engine ECU 200 performs computation based on the signals sent from the sensors and ignition switch 312 and maps and programs stored in a ROM (Read Only Memory) 202 or an SRAM (Static Random Access Memory) 204, and then, controls machinery so as to bring engine 100 into a desired operation state.

In the present preferred embodiment, engine ECU 200 detects a waveform of vibration (hereinafter, referred to as a vibration waveform) of engine 100 in a predetermined knock detecting gate (i.e., a section between a predetermined first crank angle and a predetermined second crank angle) based on the signal sent from knock sensor 300 and the crank angle, and thereafter, determines based on the detected vibration waveform whether knocking occurs in engine 100. The knock detecting gate in the present preferred embodiment ranges from a top dead center (0°) to 90° in a combustion stroke. The knock detecting gate is not limited thereto.

Figure 2:
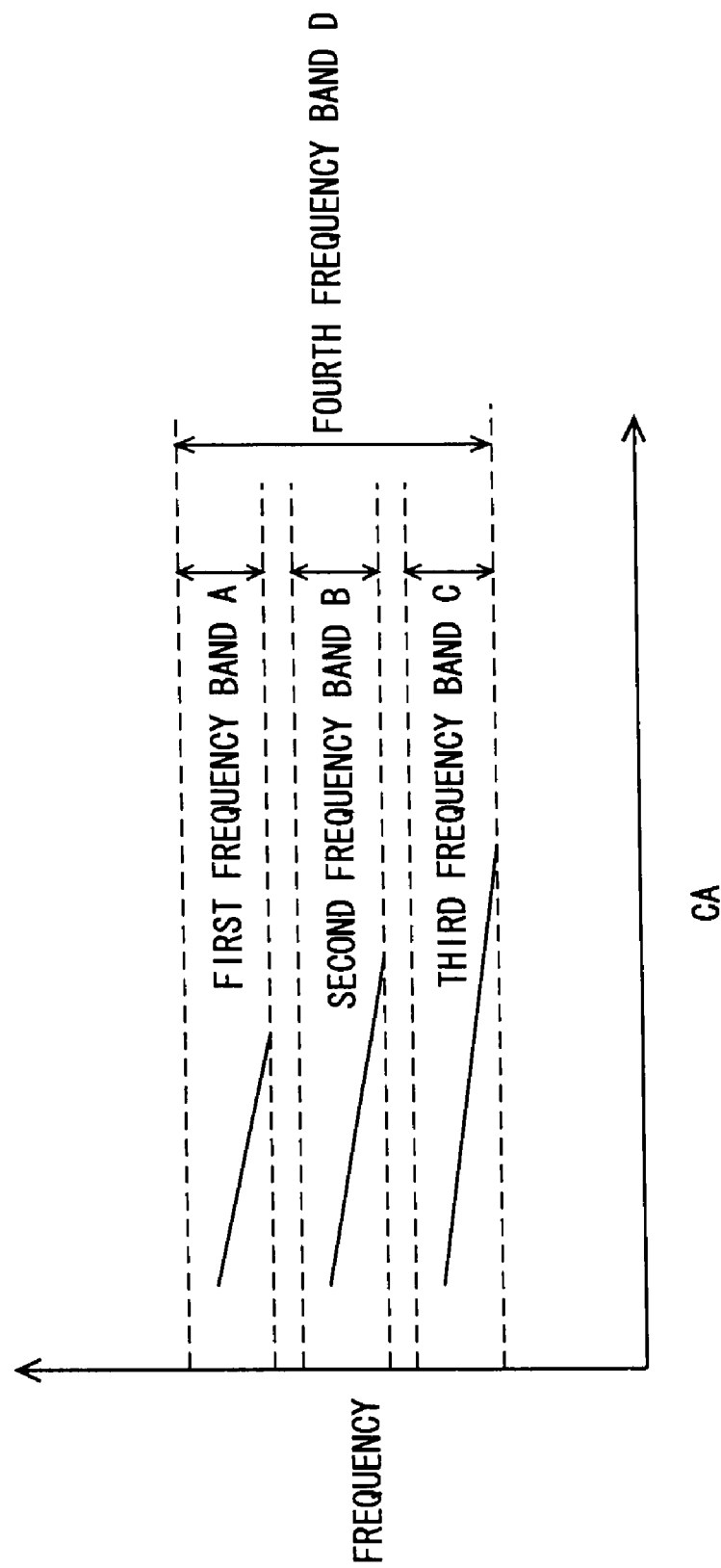
FIG. 2 is a graph showing a frequency band of vibration generated in the engine at the time of knocking.

When knocking occurs, vibrations at a frequency near a frequency indicated by a solid line in FIG. 2 are generated in engine 100. The frequency of the vibration generated caused by the knocking is not constant but is variable within a predetermined bandwidth. Therefore, as shown in FIG. 2, the vibrations included in a first frequency band A, a second frequency band B and a third frequency band C are detected in the present preferred embodiment. In addition, vibrations included in a fourth wide frequency band D including first to third frequency bands A to C are detected. In FIG. 2, reference character CA designates the crank angle. The number of frequency bands of vibrations generated due to the knocking is not restricted to three.

Figure 3:
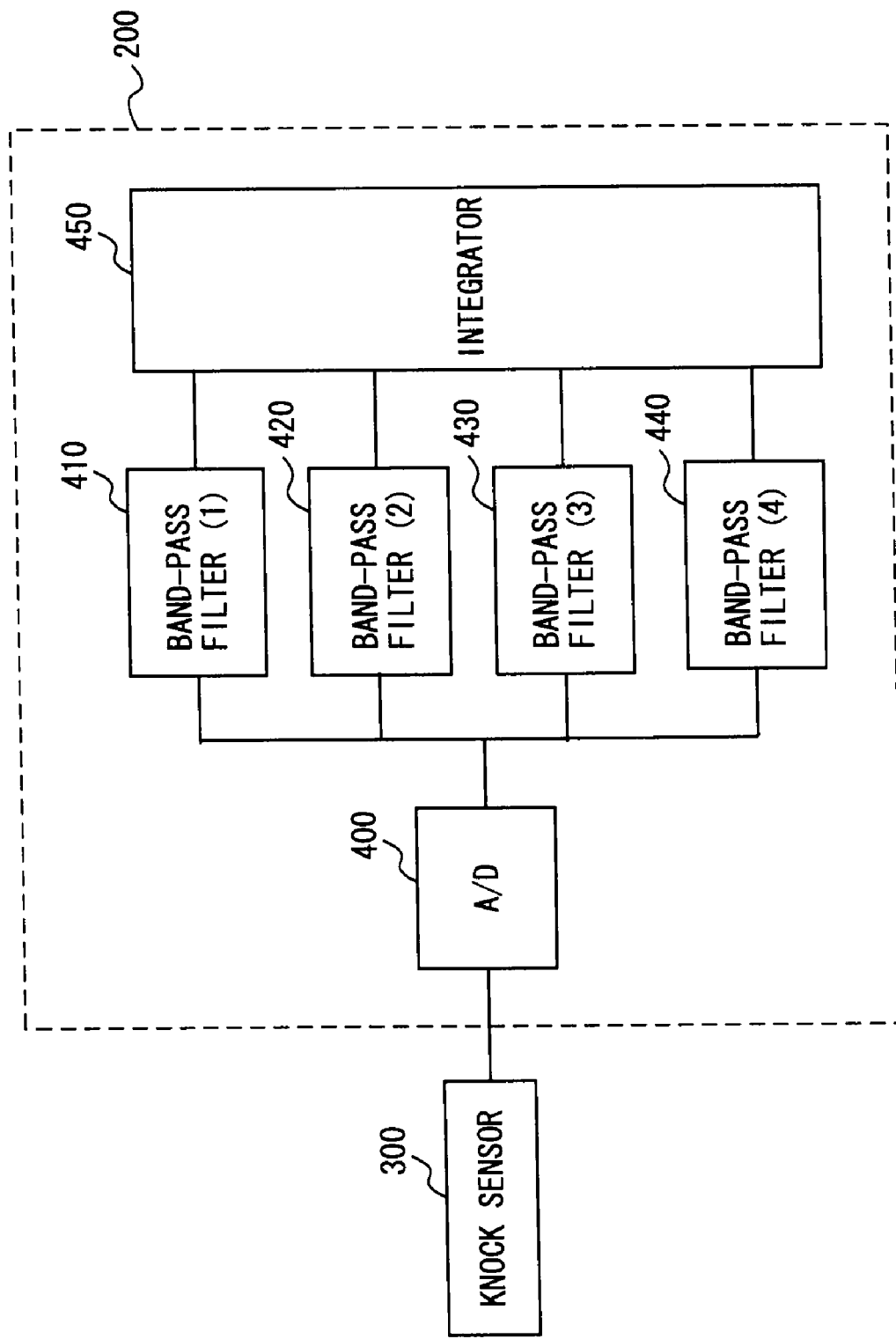
FIG. 3 is a control block diagram showing the engine ECU in FIG. 1.

With reference to FIG. 3, a further description will be given of engine ECU 200. Engine ECU 200 includes an A/D (analog/digital) converter 400, a band-pass filter (1) 410, a band-pass filter (2) 420, a band-pass filter (3) 430, a band-pass filter (4) 440 and an integrator 450.

A/D converter 400 converts an analog signal sent from knock sensor 300 into a digital signal. Band-pass filter (1) 410 allows passage of only the signal in first frequency band A out of the signals sent from knock sensor 300. In other words, band-pass filter (1) 410 extracts only the vibrations in first frequency band A from the vibrations detected by knock sensor 300.

Band-pass filter (2) 420 allows passage of only the signal in second frequency band B out of the signals sent from knock sensor 300. In other words, band-pass filter (2) 420 extracts only the vibrations in second frequency band B from the vibrations detected by knock sensor 300.

Band-pass filter (3) 430 allows passage of only the signal in third frequency band C out of the signals sent from knock sensor 300. In other words, band-pass filter (3) 430 extracts only the vibrations in third frequency band C from the vibrations detected by knock sensor 300.

Band-pass filter (4) 440 allows passage of only the signal in fourth frequency band D out of the signals sent from knock sensor 300. In other words, band-pass filter (4) 440 extracts only the vibrations in fourth frequency band D from the vibrations detected by knock sensor 300.

Integrator 450 integrates the signals selected by band-pass filters (1) 410 to (4) 440, that is, the magnitudes of the vibrations at every crank angle of 5°. The value which is integrated will be hereinafter referred to as an integrated value. The integrated value is calculated in each frequency band. The vibration waveform in each frequency band is detected by this calculation of the integrated value.

Furthermore, the calculated integrated values in first to third frequency bands A to C are added according to the crank angles. That is to say, the vibration waveforms of first to third frequency bands A to C are synthesized.

Figure 4:
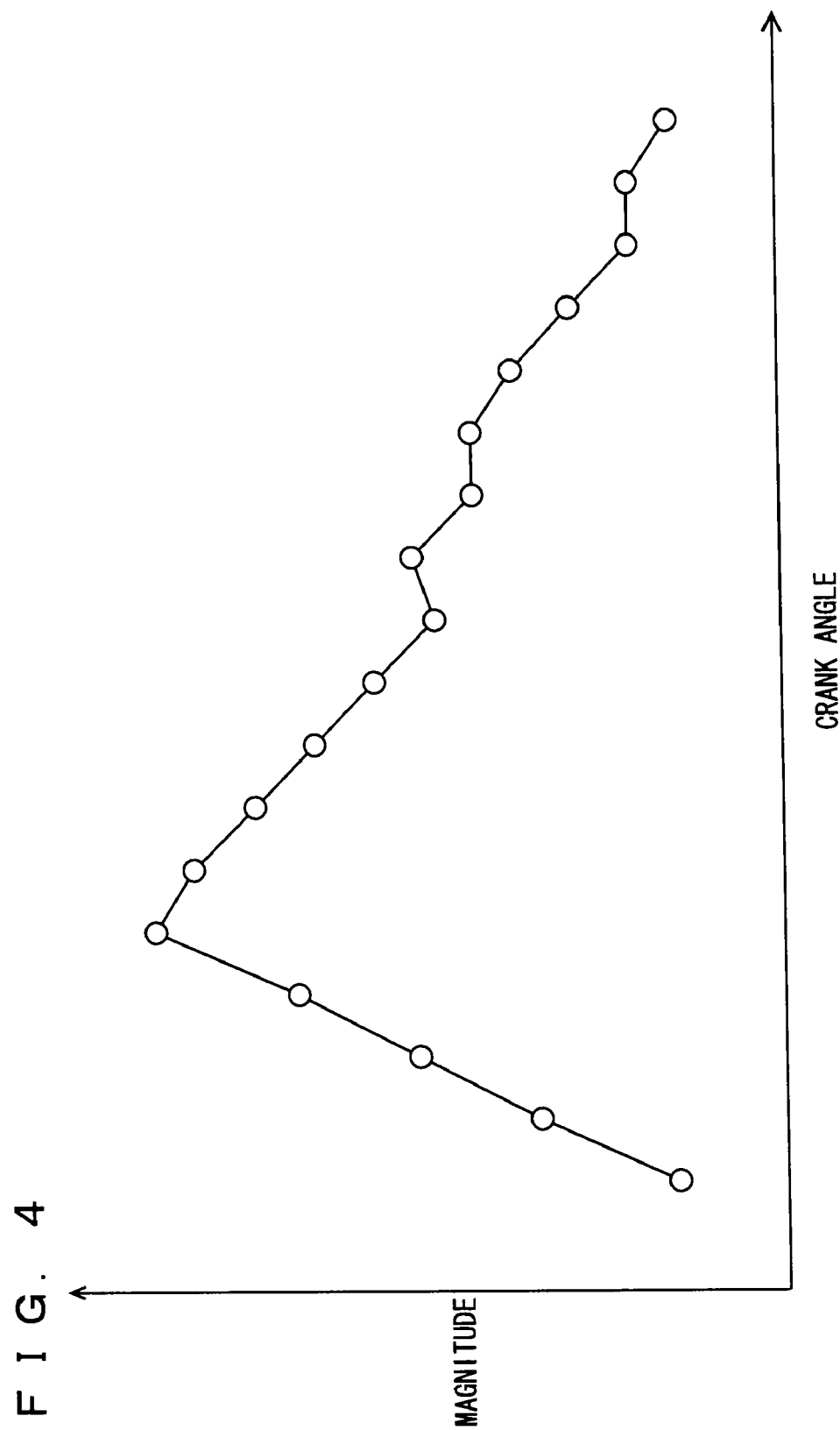
FIG. 4 is a graph showing a waveform of vibration in the engine.

In this manner, as shown in FIG. 4, the vibration waveform of engine 100 is detected. In other words, the synthesized waveform of first to third frequency bands A to C and the vibration waveform of fourth frequency band D are used as the vibration waveform of engine 100. The vibration waveform (i.e., the integrated value) of fourth frequency band D is not synthesized but singly used.

Figure 5:
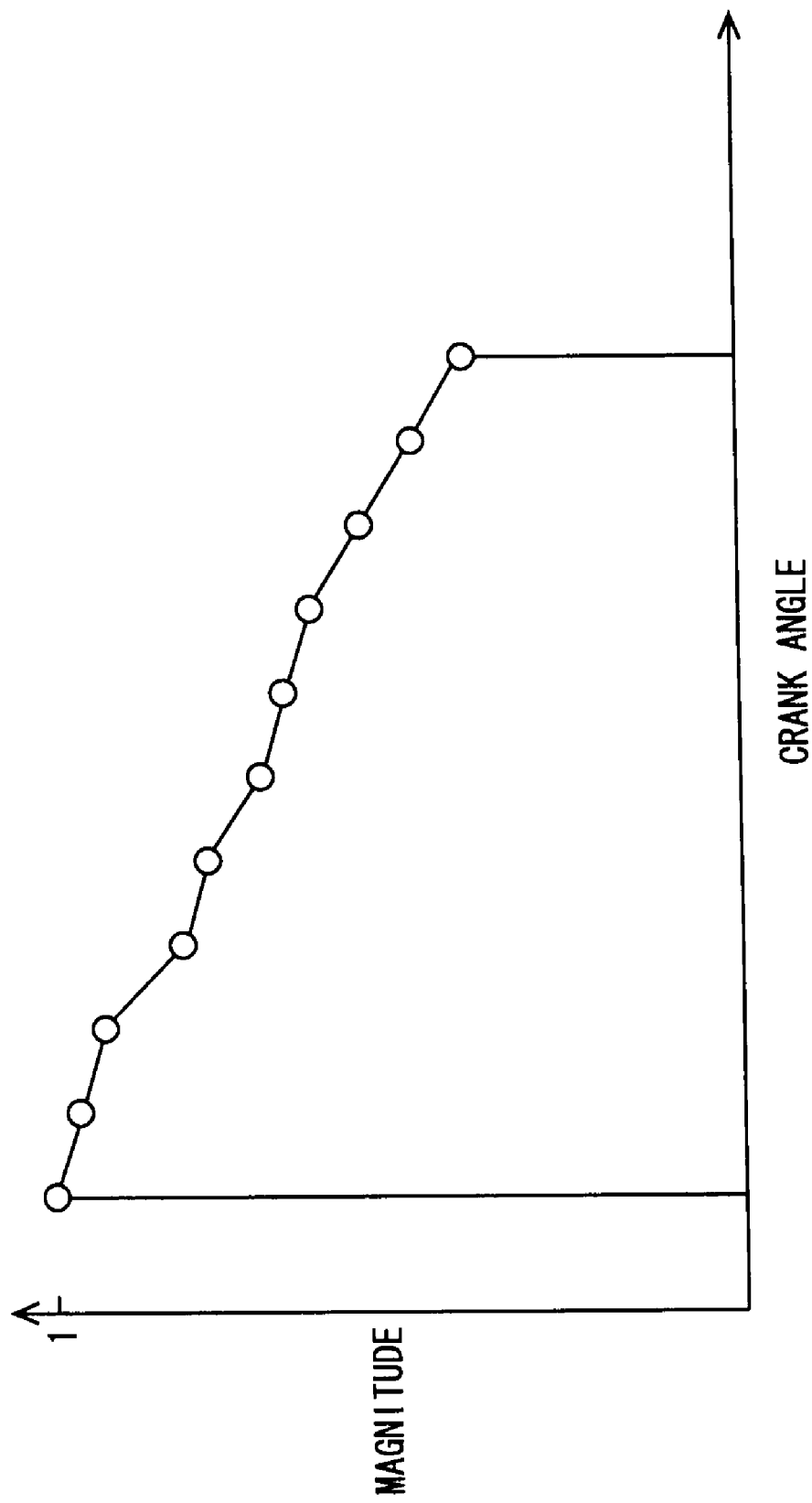
FIG. 5 is a graph showing a knock waveform model stored in a ROM in the engine ECU.

The vibration waveform of fourth frequency band D out of the detected vibration waveforms is compared with a knock waveform model stored in ROM 202 in engine ECU 200, as shown in FIG. 5. The knock waveform model is created in advance as a model of a vibration waveform when the knocking occurs in engine 100.

In the knock waveform model, the magnitudes of the vibrations are expressed as dimensionless numbers in a range of 0 to 1, wherein the magnitude of the vibration does not unitarily correspond to the crank angle. In other words, in the knock waveform model in the present preferred embodiment, it is determined that the magnitude of the vibration decreases as the crank angle increases after a peak value of the magnitude of the vibration, but a crank angle at which the magnitude of the vibration takes the peak value is not determined.

The knock waveform model in the present preferred embodiment corresponds to the vibration after the peak value of the magnitude of the vibration generated due to the knocking. ROM 202 may store therein a knock waveform model corresponding to vibrations after rising-up of the vibration caused by the knocking.

A vibration waveform of engine 100 at a time when knocking is forcibly generated by an experiment or the like is detected, and then, a knock waveform model is created and stored in advance based on the vibration waveform.

The knock waveform model is created by using engine 100 with the dimension of engine 100 and an output value from knock sensor 300, which are median values of dimensional tolerance and tolerance of the output value from knock sensor 300 (hereinafter, referred to as a median characteristic engine). That is to say, the knock waveform model is a model of a vibration waveform in a case where the knocking is forcibly generated in the median characteristic engine. A method for creating the knock waveform model is not limited to this, but it may be created by the use of simulation.

Figure 6:
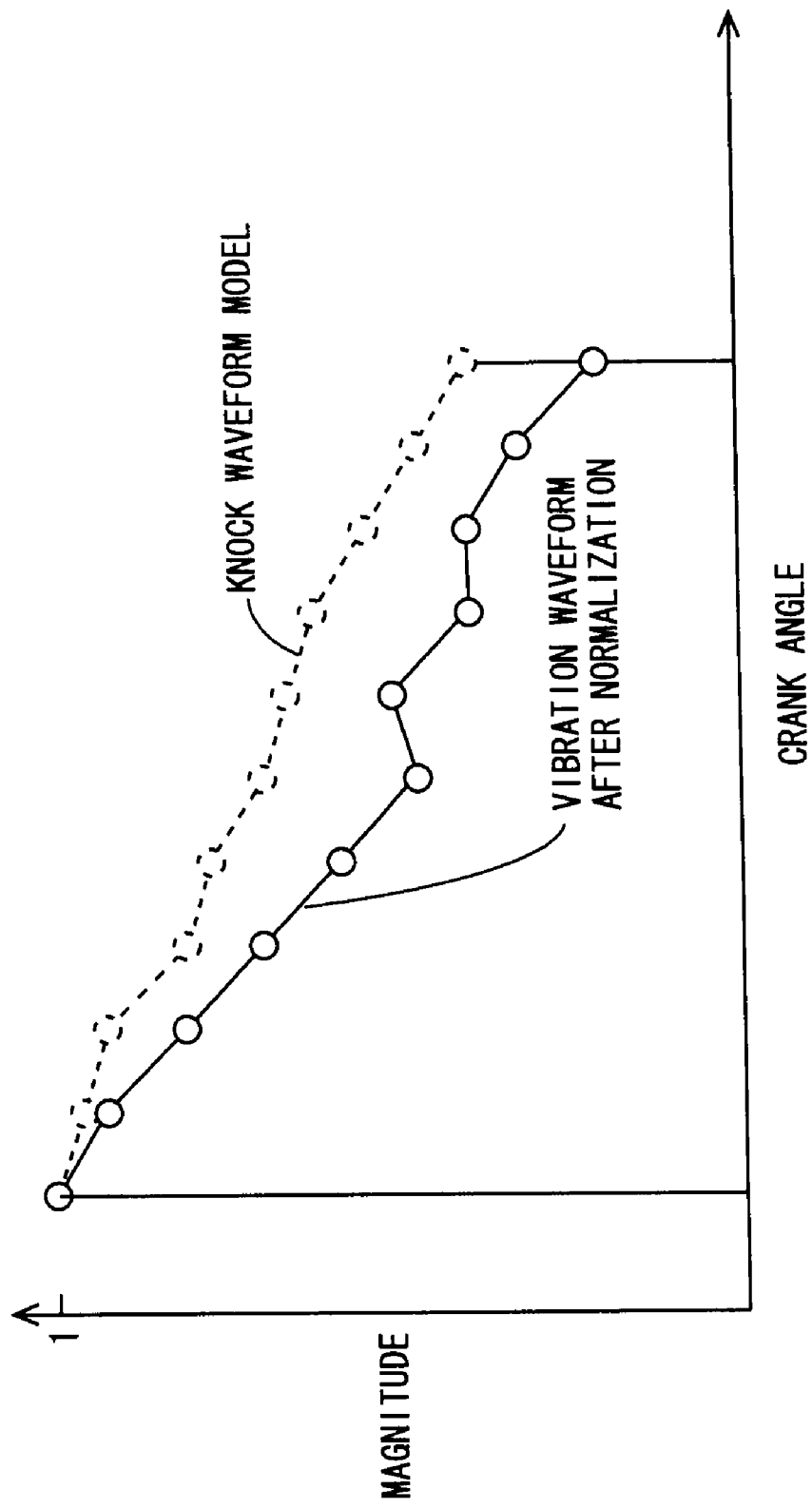
FIG. 6 is a graph (No. 1) showing a vibration waveform in a fourth frequency band D with a knock waveform model in comparison.

In comparison between the detected waveform and the knock waveform model, a normalized waveform and the knock waveform model are compared with each other, as shown in FIG. 6. Normalization signifies expressing the magnitude of the vibration as a dimensionless number in a range of 0 to 1 by dividing each of the integrated values by a maximum value of the integrated value in the detected vibration waveform, for example. The normalization is not limited thereto.

In the present preferred embodiment, engine ECU 200 calculates a correlation coefficient K which is a value related to a deviation between the normalized vibration waveform and the knock waveform model. In synchronization of a timing at which the magnitude of the vibration takes the maximum value in the vibration waveform after the normalization and a timing at which the magnitude of the vibration takes the maximum value in the knock waveform model, correlation coefficient K can be calculated by calculating an absolute value (deviation amount) of the deviation between the vibration waveform after the normalization and the knock waveform model at each crank angle (at every 5°).

Assuming that the absolute value of the deviation of the vibration waveform after the normalization and the knock waveform model from each other at each crank angle is designated by $\Delta S(I)$ (where I is a natural number) and a value (i.e., an area of the knock waveform model) obtained by integrating the magnitude of the vibration in the knock waveform model with the crank angle is denoted by S, correlation coefficient K is calculated by an equation: $K=(S-\Sigma \Delta S(I))/S$, where $\Sigma \Delta S(I)$ represents the sum of $\Delta S(I)$. In the present preferred embodiment, as the shape of the vibration waveform becomes closer to a shape of the knock waveform model, correlation coefficient K is calculated at a greater value. Therefore, when a waveform of vibration caused by factors other than the knocking is included in the vibration waveform, correlation coefficient K is calculated at a small value. Incidentally, a method for calculating correlation coefficient K is not limited thereto.

The reason for the calculation of correlation coefficient K in comparison of the vibration waveform in fourth wide frequency band D with the knock waveform model is because the accuracy of the shape of the waveform is higher than those in first to third narrow frequency bands A to C.

Figure 7:
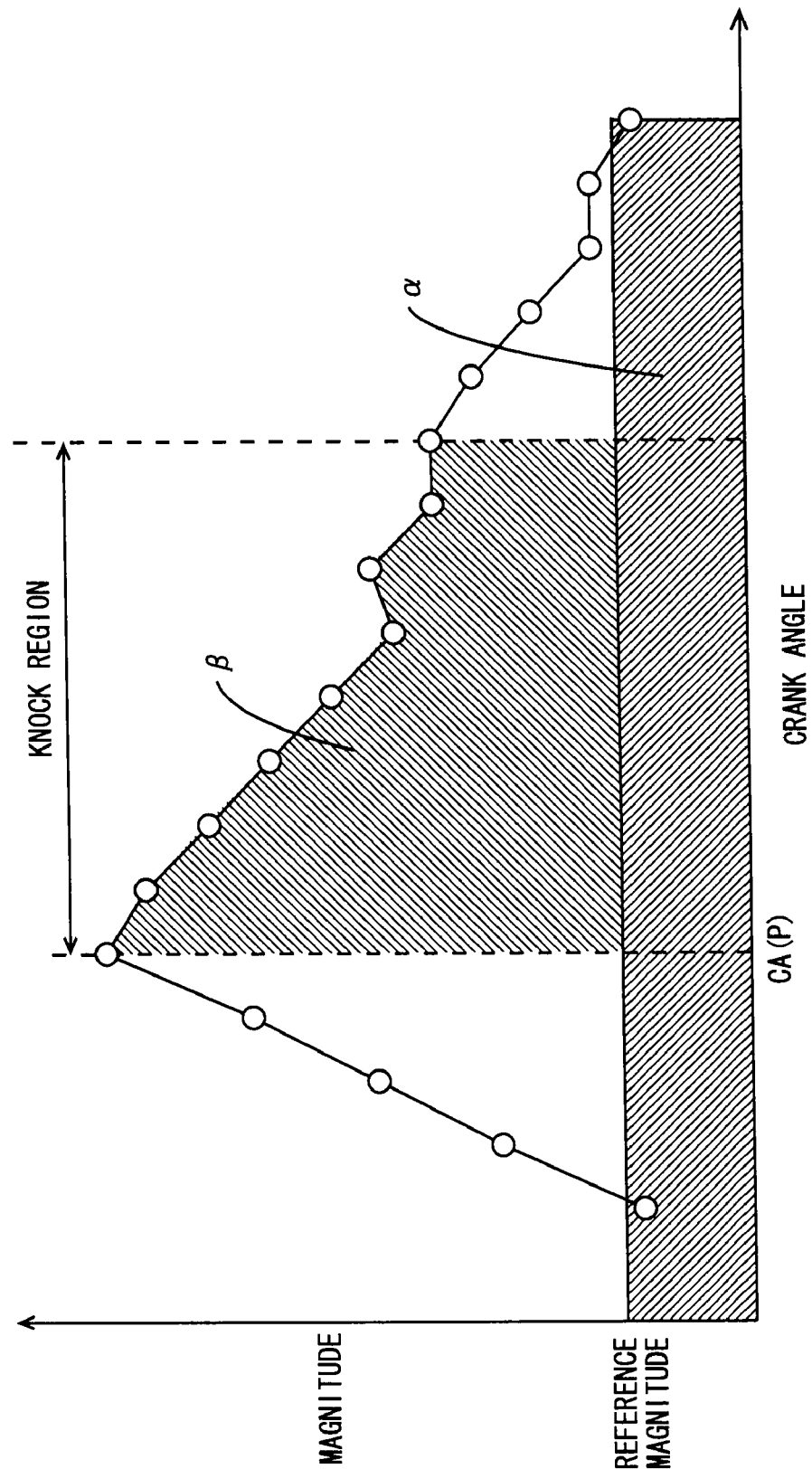
FIG. 7 is a graph (No. 1) showing a synthesized waveform of a first frequency band A to a third frequency band C for use in calculating a knock magnitude N.

A synthesized waveform of first to third frequency bands A to C is used to calculate a knock magnitude N. As diagonally shaded in FIG. 7, knock magnitude N is calculated by using a value α obtained by summing (i.e., integrating) a reference magnitude at a crank angle by 90° and a value β greater than the reference magnitude (i.e., a sum of differences between integrated values and the reference magnitude) in a knock region determined as a starting point at a crank angle CA(P) at which the integrated value takes the peak value (e.g., a region at a crank angle by 40°).

Specifically, knock magnitude N is calculated by using value β greater than the reference magnitude in a knock region in which the vibration magnitude caused by the knocking is relatively large whereas by using no value greater than the reference magnitude in a region (i.e., a region other than the knock region) in which the vibration magnitude caused by the knocking is smaller than that in the knock region (i.e., the vibration is attenuated). A method for calculating knock magnitude N will be described later.

Figure 8:
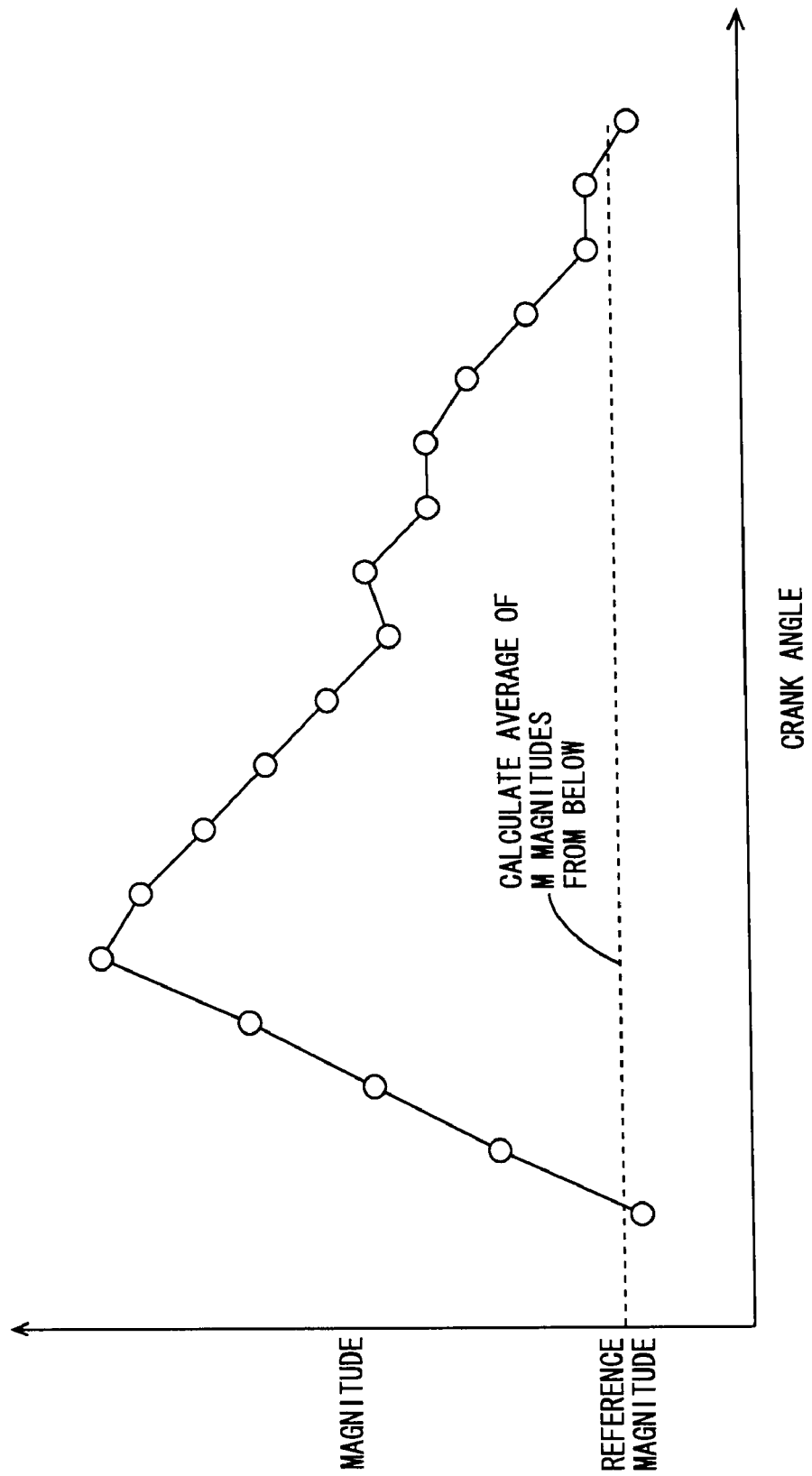
FIG. 8 is a graph showing a reference magnitude to be calculated by using an integrated value in the vibration waveform in fourth frequency band D.

The reference magnitude is calculated by using the integrated value of fourth frequency band D. As shown in FIG. 8, the reference magnitude is calculated as an average of M integrated values (where M is a natural number smaller than the number of integrated values obtained, for example "3") selected by priority of a smaller integrated value from the integrated values obtained as integrated values of fourth frequency band D. A method for calculating the reference magnitude is not limited thereto. Otherwise, an M-th smaller integrated value may be regarded as the reference magnitude.

In the present preferred embodiment, engine ECU 200 compares calculated knock magnitude N with a determination value V(KX) stored in SRAM 204, and then, determines whether knocking occurs in engine 100 for every ignition cycle.

As shown in FIG. 9, determination values V(KX) are stored in the form of a map for each of ranges divided according to an operation state in which an engine speed NE and an intake air amount KL are used as parameters. In the present preferred embodiment, nine ranges for each cylinder are provided, which are divided as follows: a low speed (NE<NE(1)); a medium speed (NE(1)≦NE<NE(2)); a high speed (NE(2)≦NE); a low load (KL<KL(1)); a medium load (KL(1)≦KL<KL(2)); and a high load (KL(2)≦KL). The number of ranges is not limited to nine. The ranges may be divided by using parameters other than engine speed NE and intake air amount KL.

At the time of shipment of engine 100 or the vehicle, a value determined in advance by an experiment or the like is used as determination value V(KX) stored in ROM 202 (an initial value of determination value V(KX) at the time of the shipment). However, a magnitude of the same vibration occurring in engine 100 may be detected as different values due to variations in output value and degradation of knock sensor 300. In this case, it is necessary to correct determination value V(KX) and to determine whether knocking occurs by using determination value V(KX) corresponding to the magnitude detected actually.

In view of this, in the present preferred embodiment, a knock determination level V(KD) is calculated based on frequency distribution representing a relationship between a magnitude value LOG(V) which is a value obtained by logarithmically converting a magnitude V and a frequency (also referred to as the number of times or a probability) of detection of each magnitude value LOG(V).

Magnitude value LOG(V) is calculated in each range in which engine speed NE and intake air amount KL are used as the parameters. Magnitude V used for calculating magnitude value LOG(V) is a peak value (a peak value of integrated values at every 5°) of magnitudes at predetermined crank angles. Based on calculated magnitude value LOG(V), a median value V(50), at which the accumulative sum of frequencies of magnitudes LOG(V) from the minimum value reaches 50%, is calculated. Furthermore, a standard deviation σ of magnitude values LOG(V) equal to or smaller than median value V(50) is calculated. For example, in the present preferred embodiment, median value V(50) and standard deviation σ, which approximate the median value and standard deviation calculated based on a plurality of magnitude values LOG(V) (e.g., 200 cycles), are calculated for each ignition cycle by the following calculation method.

When a currently detected magnitude value LOG(V) is greater than a previously calculated median value V(50), a value obtained by adding a predetermined value C(1) to previously calculated median value V(50) is calculated as a current median value V(50). In contrast, when currently detected magnitude value LOG(V) is smaller than previously calculated median value V(50), a value obtained by subtracting a predetermined value C(2) (e.g., C(2) is equal to C(1)) from previously calculated median value V(50) is calculated as current median value V(50).

When currently detected magnitude value LOG(V) is smaller than previously calculated median value V(50) and greater than a value obtained by subtracting a previously calculated standard deviation σ from previously calculated median value V(50), a value obtained by subtracting a value twice as large as a predetermined value C(3) from previously calculated standard deviation σ is calculated as a current standard deviation σ. On the other hand, when currently detected magnitude value LOG(V) is greater than previously calculated median value V(50) or smaller than a value obtained by subtracting previously calculated standard deviation σ from previously calculated median value V(50), a value obtained by adding a predetermined value C(4) (e.g., C(4) is equal to C(3)) to previously calculated standard deviation σ is calculated as current standard deviation σ. A method for calculating median value V(50) and standard deviation σ is not limited thereto. Moreover, initial values of median value V(50) and standard deviation σ may be values set in advance or may be "0".

Figure 10:
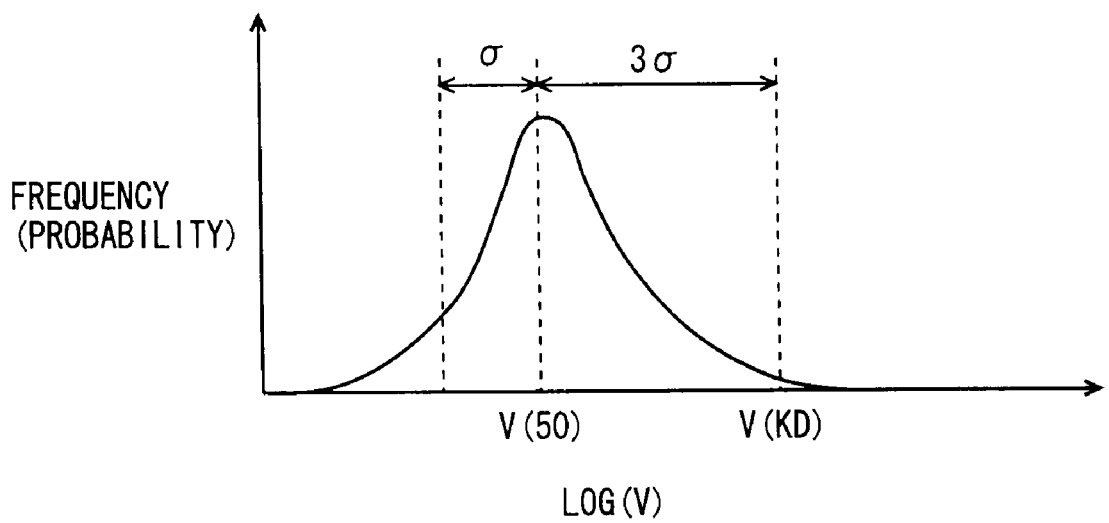
FIG. 10 is a graph (No. 1) showing frequency distribution of magnitude values LOG(V).

Knock determination level V(KD) is calculated by using median value V(50) and standard deviation σ. As shown in FIG. 10, a value obtained by adding the product of a coefficient U(1) (U(1) is a constant and U(1)=3, for example) and standard deviation σ to median value V(50) is knock determination level V(KD). Incidentally, a method for calculating knock determination level V(KD) is not limited thereto.

A proportion (frequency) of magnitude values LOG(V) greater than knock determination level V(KD) is determined as a frequency of occurrence of knocking, and is counted as a knock proportion KC. When knock proportion KC is greater than a threshold value KC(0), determination value V(KX) is corrected to be reduced by a predetermined correction amount so that the frequency of retarding the ignition timing becomes higher. In contrast, when knock proportion KC is smaller than threshold value KC(0), determination value V(KX) is corrected to be increased by a predetermined correction amount so that the frequency of advancing the ignition timing becomes higher.

Coefficient U(1) is obtained based on data and findings from experiments and the like. Magnitude value LOG(V) greater than knock determination level V(KD) when U(1)=3 substantially accords with magnitude value LOG(V) in an ignition cycle in which knocking actually occurs. A value other than "3" may be used as coefficient U(1).

Figure 11:
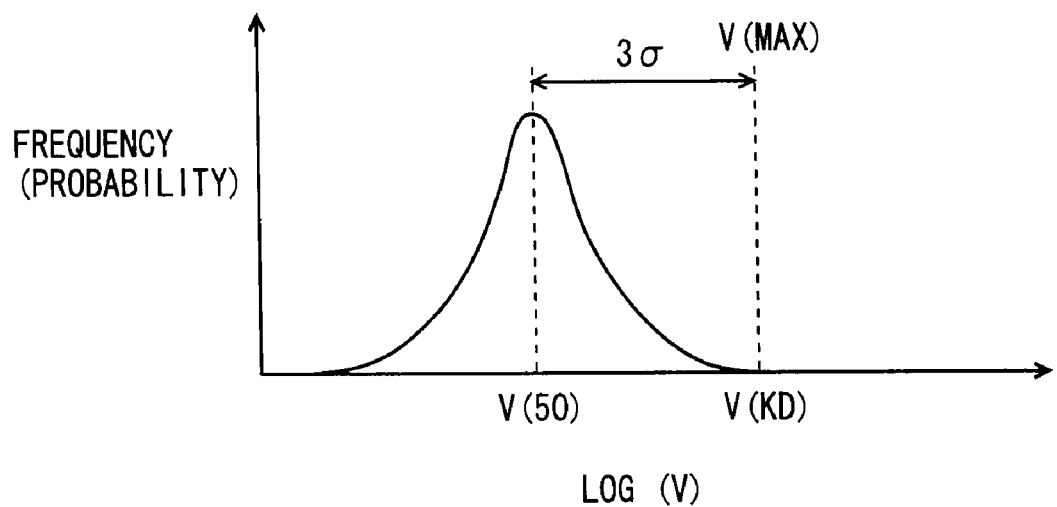
FIG. 11 is a graph (No. 2) showing the frequency distribution of magnitude values LOG(V).
Figure 12:
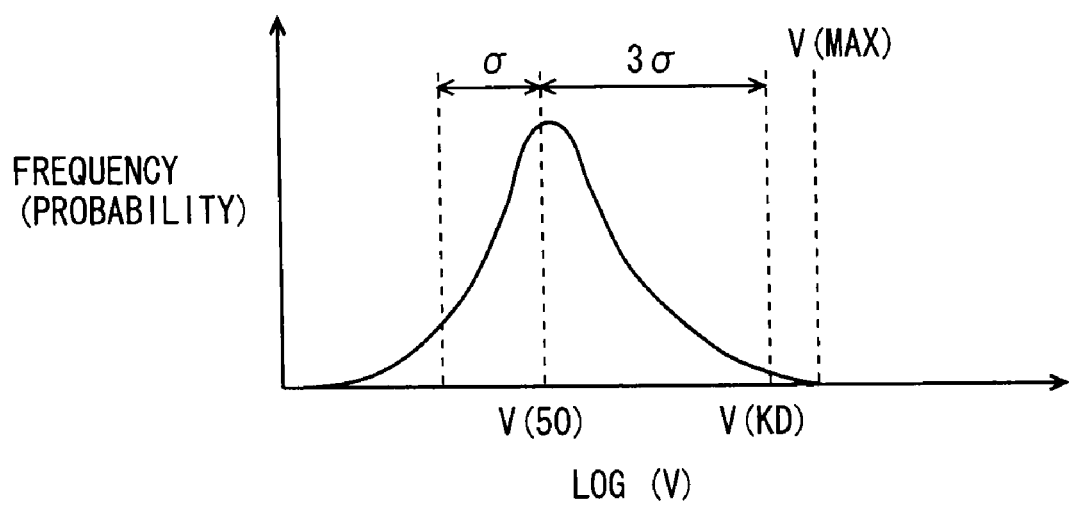
FIG. 12 is a graph (No. 3) showing the frequency distribution of magnitude values LOG(V).

When no knocking occurs in engine 100, the frequency distribution of magnitude values LOG(V) becomes a normal distribution shown in FIG. 11, so that a maximum value V(MAX) of magnitude value LOG(V) and knock determination level V(KD) accord with each other. On the other hand, when the occurrence of knocking increases magnitude V to be detected. When a great magnitude value LOG(V) is calculated, maximum value V(MAX) becomes greater than knock determination level V(KD), as shown in FIG. 12.

Figure 13:
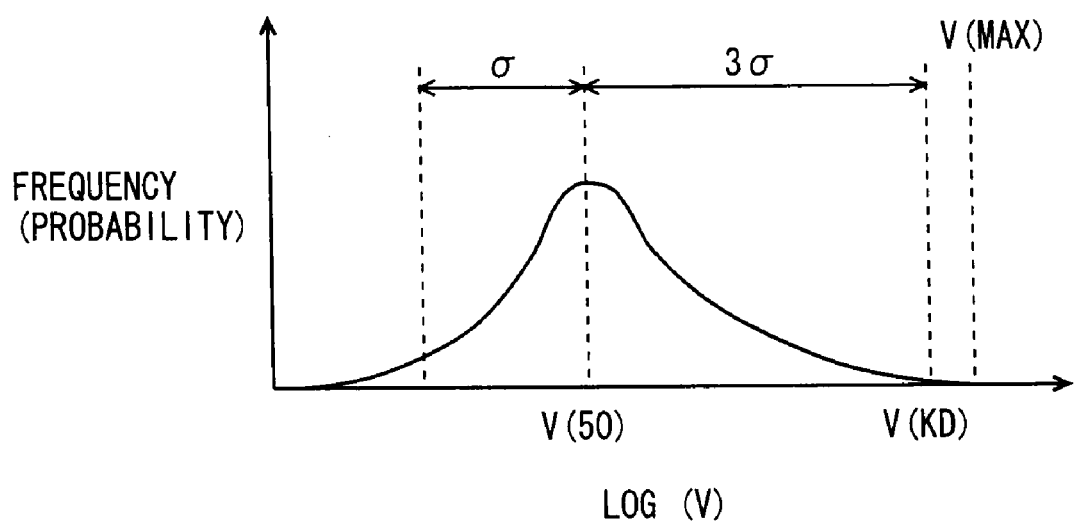
FIG. 13 is a graph (No. 4) showing the frequency distribution of magnitude values LOG(V).

When the frequency of occurrence of knocking becomes much higher, as shown in FIG. 13, maximum value V(MAX) becomes much greater. Median value V(50) and standard deviation σ in the frequency distribution become greater as maximum value V(MAX) becomes greater. As a result, knock determination level V(KD) becomes greater.

Magnitude value LOG(V) smaller than knock determination level V(KD) is not determined as magnitude value LOG(V) in a cycle in which knocking occurs. Therefore, as knock determination level V(KD) becomes greater, the frequency of determining that no knocking occurs irrespective of actual occurrence of knocking becomes greater.

Figure 14:
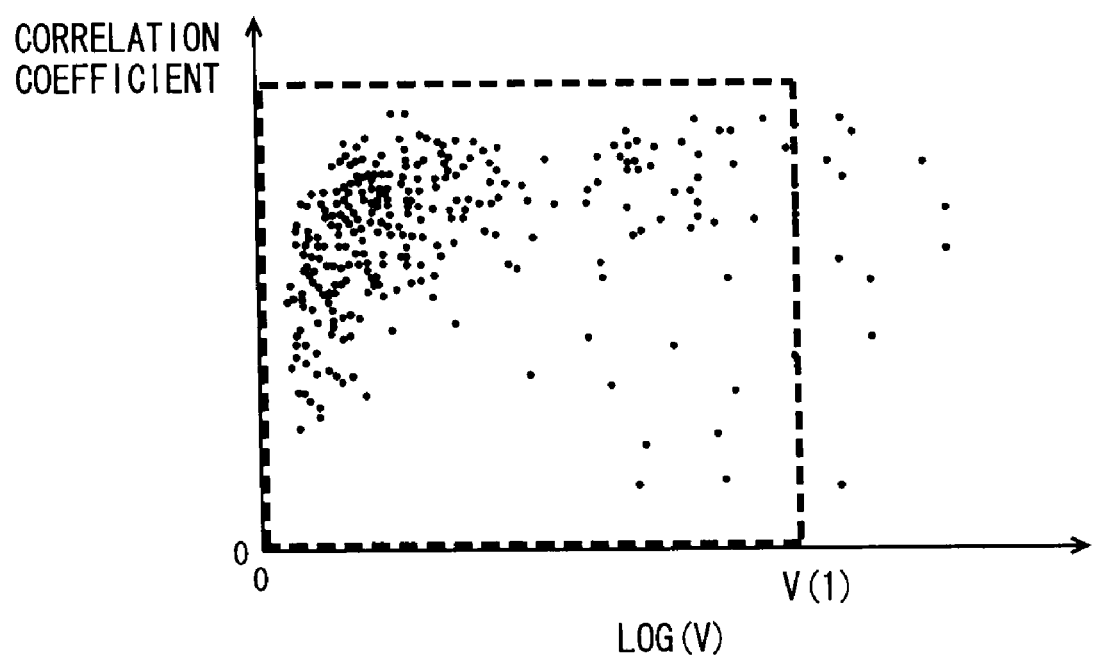
FIG. 14 is a graph showing magnitude values LOG(V) for use in creating the frequency distribution of magnitude values LOG(V).

In view of this, in the present preferred embodiment, median value V(50) and standard deviation σ are calculated by using magnitude values LOG(V) plotted within a range surrounded by a broken line in FIG. 14 except for magnitude values LOG(V) greater than a threshold value V(1). FIG. 14 is a graph in which calculated magnitude values LOG(V) are plotted per correlation coefficient K in a cycle in which magnitude values LOG(V) are obtained.

Threshold value V(1) is a value obtained by adding, to the median value of frequency distribution of magnitude values LOG(V), the product of a coefficient U(2) (U(2) represents a constant and is 3, for example) and a standard deviation of magnitude values LOG(V) equal to or smaller than the median value.

By extracting only magnitude values LOG(V) smaller than threshold value V(1) to calculate median value V(50) and standard deviation σ, median value V(50) and standard deviation σ do not become excessively great but are stabilized. As a result, knock determination level V(KD) can be suppressed from becoming excessively high. Therefore, the frequency of determination as if no knocking would occur irrespective of actual occurrence of knocking can be suppressed from becoming high.

The method for extracting magnitude values LOG(V) used for calculating median value V(50) and standard deviation σ is not limited thereto. For example, magnitude values LOG (V) calculated in the ignition cycles in which correlation coefficient K is greater than threshold value K(1) may be extracted out of magnitude values LOG(V) smaller than threshold value V(1), described above.

Figure 15:
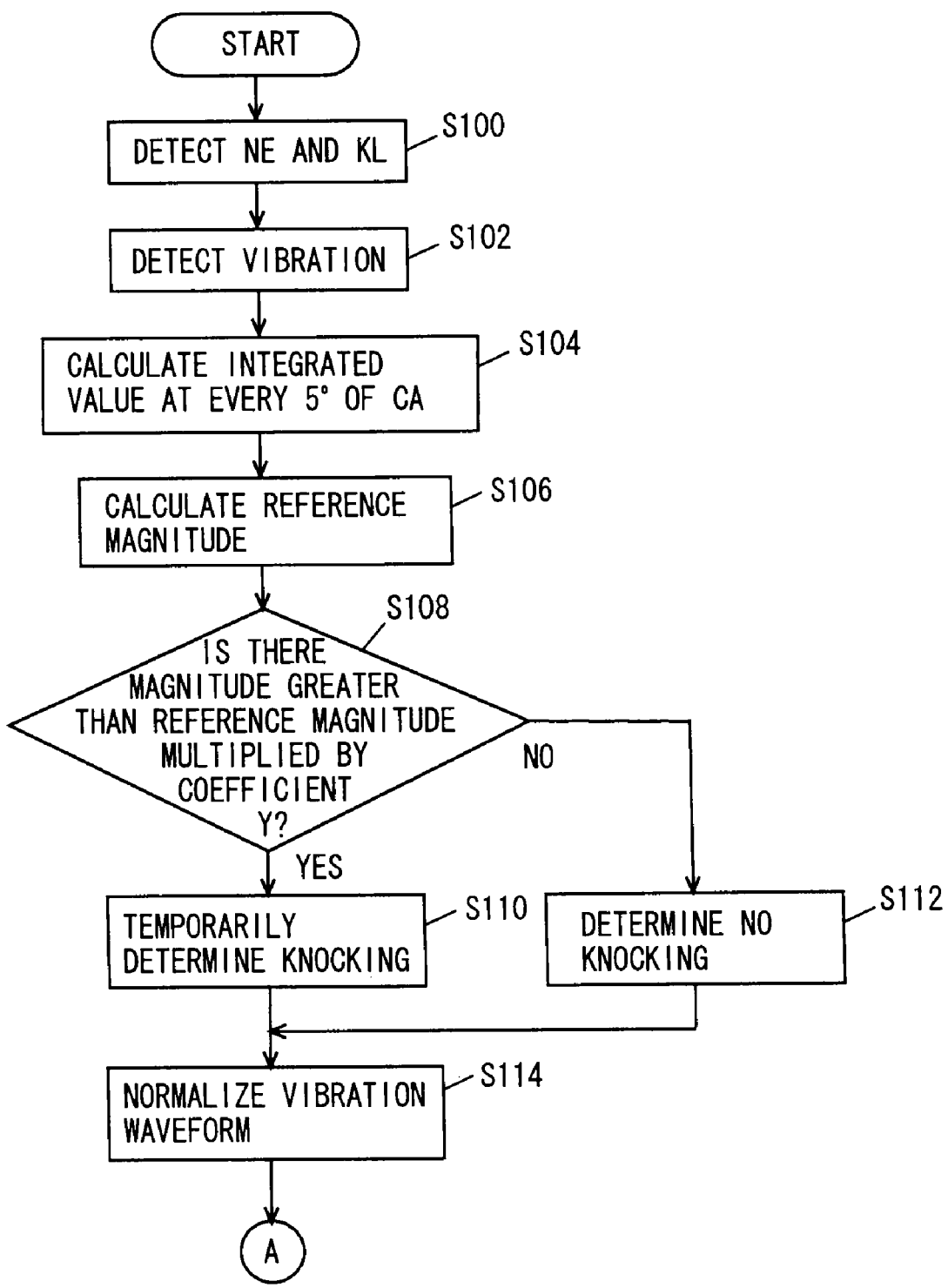
FIG. 15 is a flowchart (No. 1) showing a control structure of a program to be executed by the engine ECU serving as the knocking determination device in the preferred embodiment according to the present invention.
Figure 16:
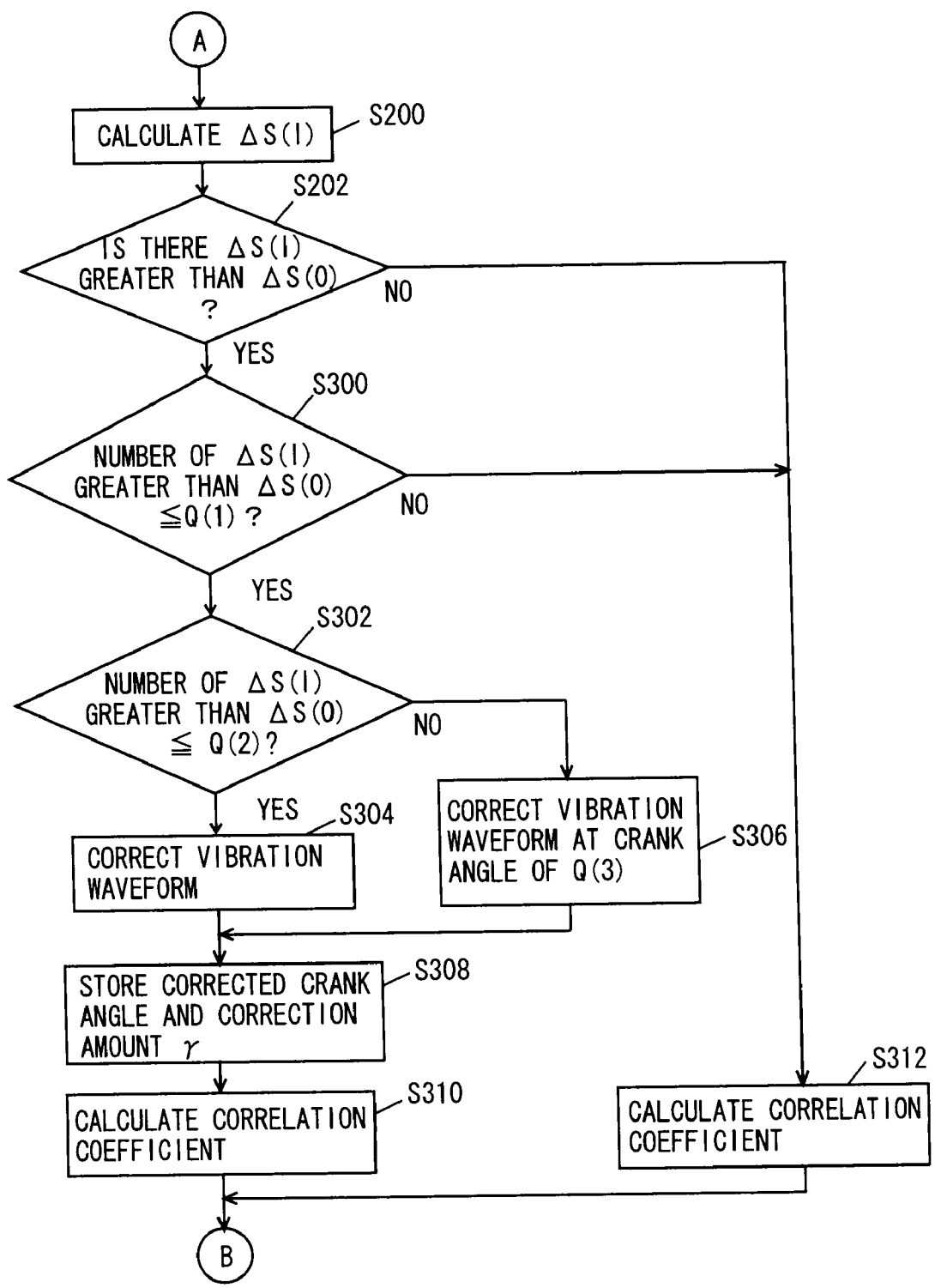
FIG. 16 is a flowchart (No. 2) showing the control structure of the program to be executed by the engine ECU serving as the knocking determination device in the preferred embodiment according to the present invention.
Figure 17:
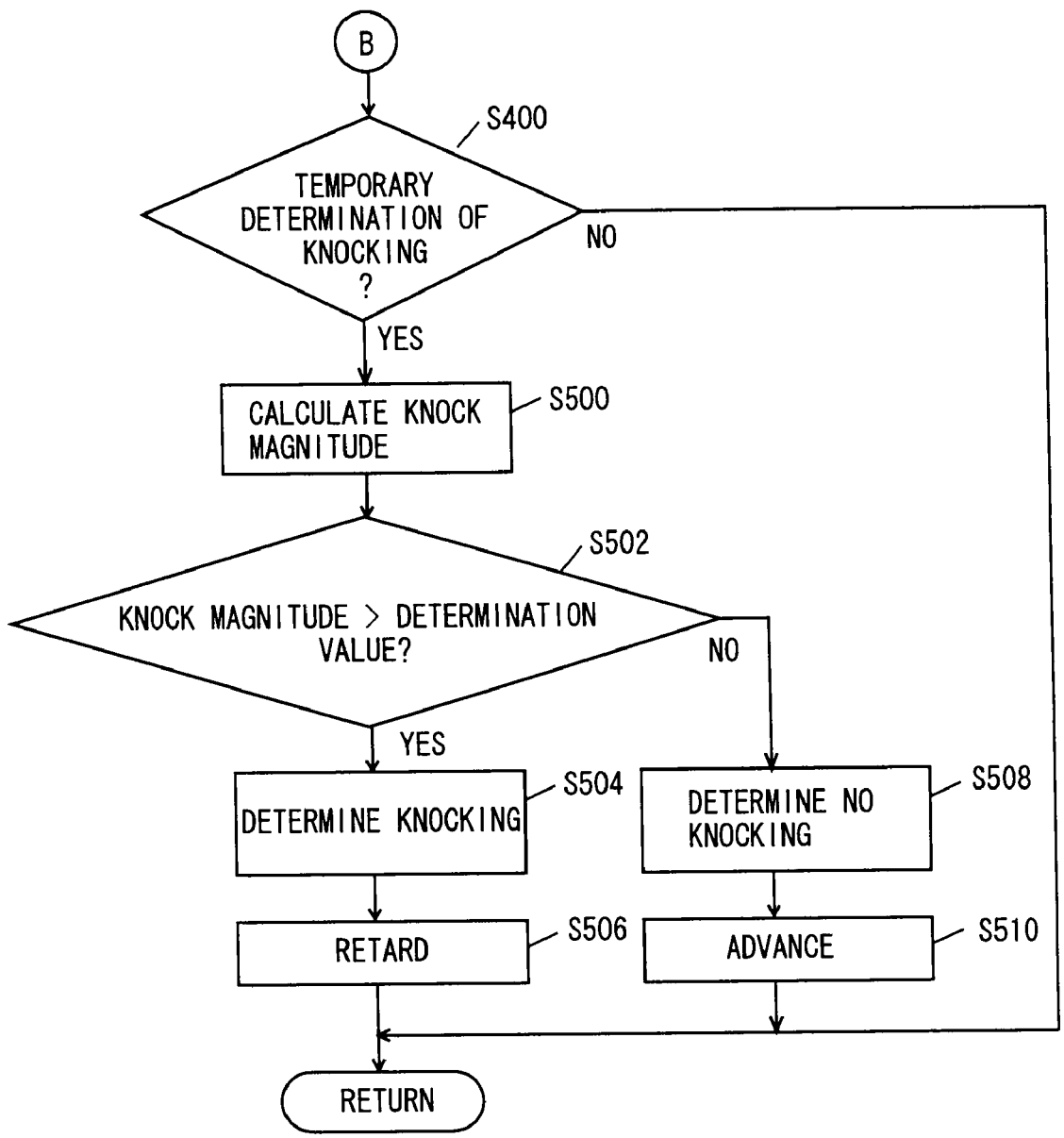
FIG. 17 is a flowchart (No. 3) showing the control structure of the program to be executed by the engine ECU serving as the knocking determination device in the preferred embodiment according to the present invention.

With reference to FIGS. 15 to 17, a description will be given of a control structure of a program, which is executed by engine ECU 200 serving as the knocking determiner in the present preferred embodiment so as to determine in each ignition cycle whether knocking occurs, thereby controlling the ignition timing.

In step 100 (hereinafter, "step" will be abbreviated as "S"), engine ECU 200 detects engine speed NE in response to a signal sent from crank position sensor 306, and further, detects intake air amount KL in response to a signal sent from air flow meter 314.

In S102, engine ECU 200 detects the magnitude of the vibration of engine 100 in response to a signal sent from knock sensor 300. The magnitude of the vibration is expressed as an output voltage of knock sensor 300. The magnitude of the vibration may be expressed as a value corresponding to the output voltage of knock sensor 300. The detection of the magnitude is carried out between the top dead center and 90° (a crank angle of 90°) in a combustion stroke.

In S104, engine ECU 200 calculates a value (an integrated value) obtained by integrating the output voltages (values representing magnitudes of vibrations) of knock sensor 300 at every 5° (by 5°) of a crank angle. The integrated value is calculated on each of the vibrations in first to fourth frequency bands A to D. At this time, the integrated values in first to third frequency bands A to C are added to correspond to the crank angles. In other words, the vibration waveforms in first to third frequency bands A to C are synthesized.

In S106, engine ECU 200 calculates a reference magnitude as an average of M integrated values selected by priority of a smaller integrated value based on an integrated value in fourth frequency band D.

In S108, engine ECU 200 determines whether an integrated value greater than a product of the reference magnitude and a coefficient Y (where Y is a positive value, for example, "2") is included in the integrated value in fourth frequency band D at the crank angle from the top dead center to CA(A) (CA(A)<90°, for example, 45°).

When there is an integrated value greater than the product of the reference magnitude and coefficient Y (i.e., YES in S108), the control routine proceeds to ST 10. In contrast, if otherwise (i.e., NO in S108), the control routine proceeds to S112.

In S110, engine ECU 200 temporarily determines that knocking occurs. In contrast, in S112, engine ECU 200 determines that no knocking occurs.

In S114, engine ECU 200 normalizes the vibration waveform in fourth frequency band D. The normalization signifies expressing the magnitude of the vibration as a dimensionless number in a range of 0 to 1 by dividing each of the integrated values by the peak value of the integrated value in the vibration waveform.

In S200, engine ECU 200 calculates absolute value ΔS(I) of the deviation of the vibration waveform in fourth frequency band D after the normalization from the knock waveform model at each crank angle.

In S202, engine ECU 200 determines whether there is ΔS(I) greater than threshold value ΔS(0). When there is ΔS(I) greater than threshold value ΔS(0) (YES in S202), the control routine proceeds to S300. In contrast, if otherwise (i.e., NO in S202), the control routine jumps to S312.

In S300, engine ECU 200 determines whether the number of ΔS(I) greater than threshold value ΔS(0) is equal to or smaller than a predetermined number Q(1). When the number of ΔS(I) greater than threshold value ΔS(0) is equal to or smaller than predetermined number Q(1) (YES in S300), the control routine proceeds to S302. In contrast, if otherwise (NO in S300), the control routine jumps to S312.

In S302, engine ECU 200 determines whether the number of ΔS(I) greater than threshold value ΔS(0) is equal to or smaller than a predetermined number Q(2). When the number of ΔS(I) greater than threshold value ΔS(0) is equal to or smaller than predetermined number Q(2) (YES in S302), the control routine proceeds to S304. In contrast, if otherwise (NO in S302), the control routine proceeds to S306.

In S304, engine ECU 200 corrects the normalized vibration waveform such that the magnitude accords with the magnitude of the knock waveform model (such that ΔS(I) is reduced down to "0") at crank angles, at which ΔS(I) is greater than threshold value ΔS(0).

In S306, engine ECU 200 corrects the normalized vibration waveform such that the magnitude accords with the magnitude of the knock waveform model (such that ΔS(I) is reduced down to "0") at a crank angle of Q(3) (Q(3)<Q(1)) while placing a higher priority on crank angles having greater ΔS(I) out of the crank angles, at which ΔS(I) is greater than threshold value ΔS(0).

In S308, engine ECU 200 stores the corrected crank angle and its correction amount (i.e., a product of ΔS(I) and the peak value of the integrated values) γ in SRAM 204.

In S310, engine ECU 200 compares the corrected vibration waveform with the knock waveform model, and then, calculates correlation coefficient K which is a value related to the deviation of the corrected vibration waveform from the knock waveform model.

In S312, engine ECU 200 compares the normalized vibration waveform (which is not corrected) with the knock waveform model, and then, calculates correlation coefficient K which is a value related to the deviation of the normalized vibration waveform from the knock waveform model.

In S400, engine ECU 200 determines whether the occurrence of the knocking is temporarily determined. When the occurrence of the knocking is temporarily determined (YES in S400), the control routine proceeds to S500. In contrast, if otherwise (NO in S400), the control routine comes to an end.

In S500, engine ECU 200 calculates knock magnitude N. Knock magnitude N is calculated by the use of the synthesized waveform of first to third frequency bands A to C. As diagonally shaded in FIG. 7, knock magnitude N is calculated by using value α obtained by summing (i.e., integrating) the reference magnitude at a crank angle by 90° (i.e., by a knock detecting gate), value β greater than the reference magnitude in the knock region determined as a starting point at crank angle CA(P) at which the integrated value becomes the peak value, and correction amount γ of the vibration waveform, as follows:

$$N=(\alpha+(\beta-\gamma)\times K)/\alpha \quad (1)$$

where, if the vibration waveform is not corrected, knock magnitude N is calculated where γ=0.

In S502, engine ECU 200 determines whether knock magnitude N is greater than determination value V(KX). When knock magnitude N is greater than determination value V(KX) (YES in S502), the control routine proceeds to S504. In contrast, if otherwise (NO in S502), the control routine proceeds to S508.

In S504, engine ECU 200 determines that knocking occurs in engine 100. In S506, engine ECU 200 retards the ignition timing.

In S508, engine ECU 200 determines that no knocking occurs in engine 100. In S510, engine ECU 200 advances the ignition timing.

Description will be made on operation of engine ECU 200 serving as the knocking determination device in the present preferred embodiment with the above-described structure and with reference to the above-described flowcharts. In the following description, assuming that the above-described predetermined number Q(1) is "3", Q(2) is "2" and Q(3) is "1".

During the operation of engine 100, engine speed NE is detected in response to the signal sent from crank position sensor 306, and further, intake air amount KL is detected in response to the signal sent from air flow meter 314 (S100). Moreover, the magnitude of vibration of engine 100 is detected in response to the signal sent from knock sensor 300 (S102).

Between the top dead center and 90° in the combustion stroke, the integrated value at every 5° is calculated on each of the vibrations in first to fourth frequency bands A to D (S104). Moreover, the calculated integrated values in first to third frequency bands A to C are added according to the crank angles, thereby synthesizing the vibration waveform.

Figure 18:
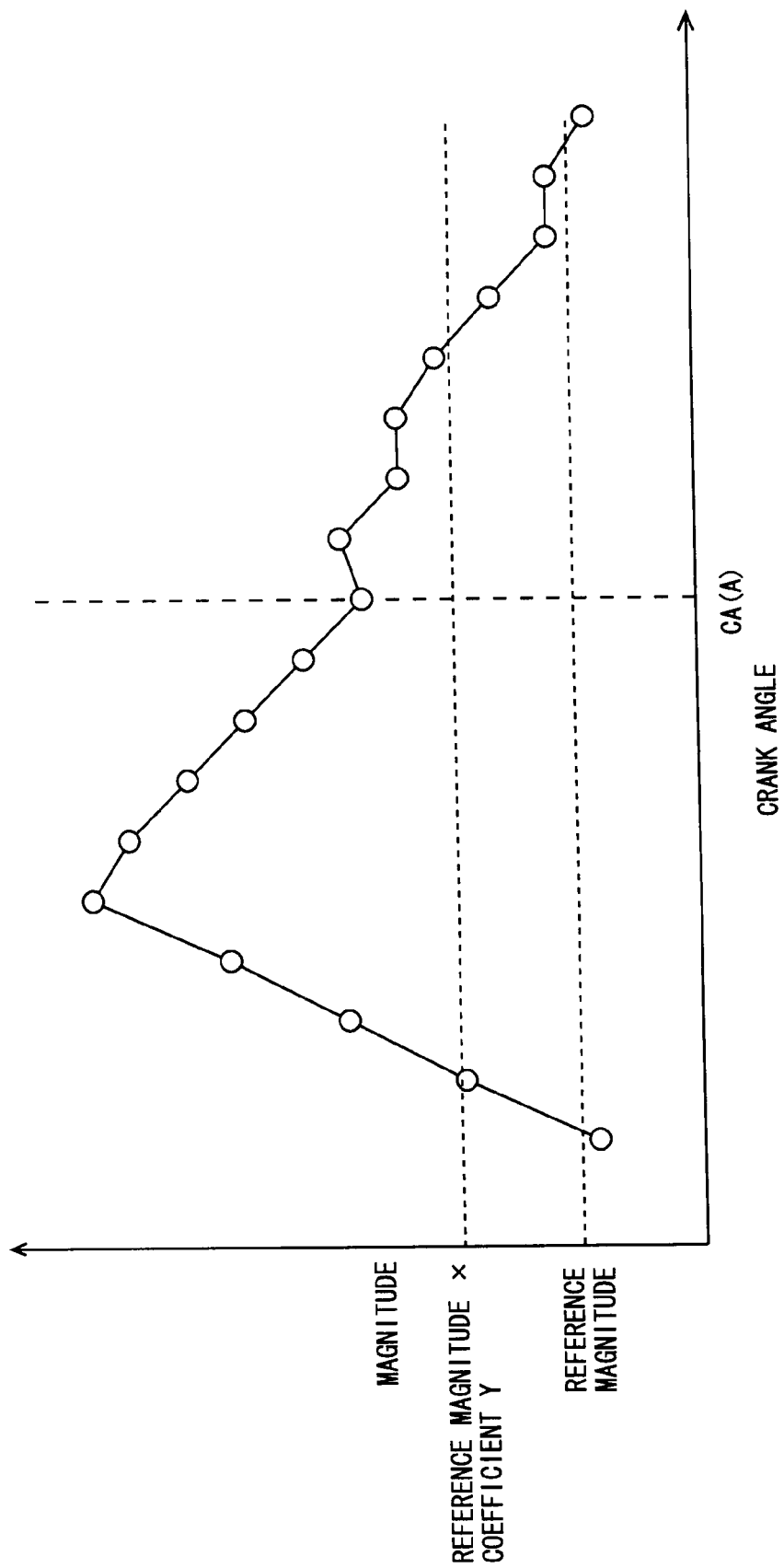
FIG. 18 is a graph showing the vibration waveform in fourth frequency band D.

The reference magnitude is calculated as the average of the M integrated values selected by priority of the smaller integrated value (S106) based on the integrated value in fourth frequency band D. Since the knocking occurs at substantially the same crank angle, if there is the integrated value greater than the product of the reference magnitude and coefficient Y at the crank angle between the top dead center and CA(A) (i.e., YES in S108), as shown in FIG. 18, it is construed that there is a possibility of occurrence of knocking. Therefore, it is temporarily determined that the knocking occurs (S110).

In contrast, if there is no integrated value greater than the product of the reference magnitude and coefficient Y at the crank angle between the top dead center and CA(A) (i.e., NO in S108), it is construed that the possibility of the occurrence of the knocking is remarkably low. Therefore, it is determined that no knocking occurs (S112).

Thereafter, if or unless it is determined that the knocking occurs, the vibration waveform in fourth frequency band D is normalized (S114). With the normalization, the magnitude of the vibration in the vibration waveform is expressed as a dimensionless number in a range of 0 to 1. As a consequence, the detected vibration waveform can be compared with the knock waveform model irrespective of the magnitude of the vibration. Thus, it is unnecessary to store numerous knock waveform models corresponding to the vibration magnitudes, thereby facilitating the creation of the knock waveform model.

The timing at which the magnitude of the vibration takes a maximum value in the vibration waveform after the normalization accords with the timing at which the magnitude of the vibration takes a maximum value in the knock waveform model (see FIG. 6), followed by calculating the absolute value $\Delta S(I)$ of the deviation between the vibration waveform after the normalization and the knock waveform model at each crank angle in this state (S200).

Figure 19:
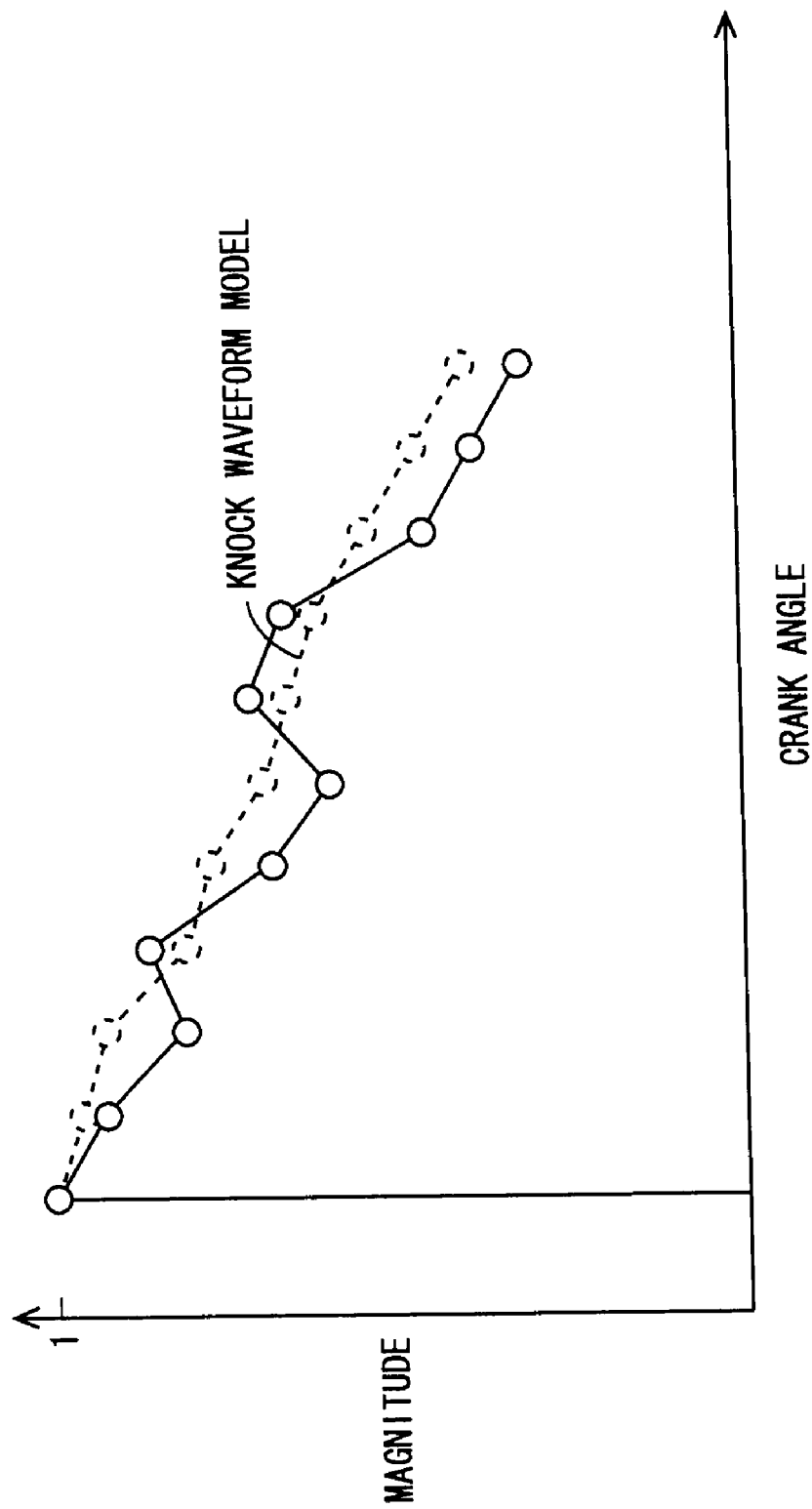
FIG. 19 is a graph (No. 2) showing the vibration waveform in fourth frequency band D with the knock waveform model in comparison.

At this time, as shown in FIG. 19, since a vibration waveform similar to the knock waveform model is obtained, when there is no $\Delta S(I)$ greater than threshold value $\Delta S(0)$ (NO in S202), it is considered that the obtained vibration waveform does not include any vibration due to noise other than the knocking (vibration due to the actuation of intake valve 116, exhaust valve 118, injector 104 (in particular, the direct injector for directly injecting fuel into the cylinder) and pump 120 (in particular, the high-pressure pump for supplying fuel into the direct injector).

In this case, based on the sum $\Sigma\Delta S(I)$ of calculated $\Delta S(I)$ and value S obtained by integrating the magnitude of the vibration in the knock waveform model at the crank angle, correlation coefficient K is calculated as follows: $K=(S-\Sigma\Delta S(I))/S$ (S312).

In this manner, it is possible to objectively determine the degree of the accordance between the detected vibration waveform and the knock waveform model by converting the degree into a number. Furthermore, it is possible to analyze the vibration at the time of the knocking from the behavior of the vibration such as an attenuation trend of the vibration by comparing the vibration waveform and the knock waveform model with each other.

Meanwhile, it is generally known that vibration due to noise of intake valve 116, exhaust valve 118, injector 104, pump 120 and the like has such characteristics that it is great in magnitude but attenuates more quickly than the vibration due to the knocking. That is to say, an occurrence period of the vibration due to the noise is shorter than that of the vibration due to the knocking.

Figure 20:
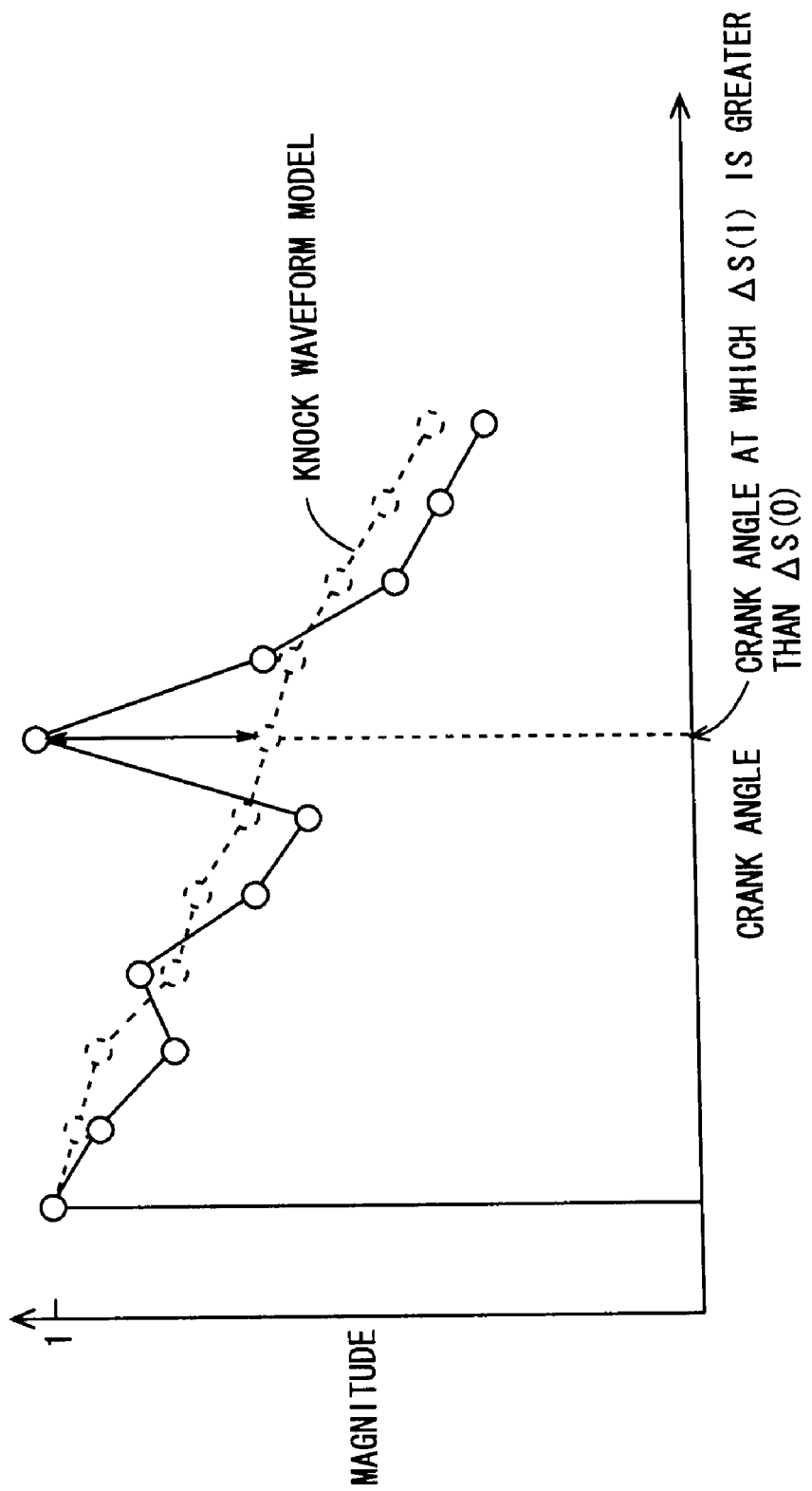
FIG. 20 is a graph (No. 3) showing the vibration waveform in fourth frequency band D with the knock waveform model in comparison.

As a consequence, as shown in FIG. 20, when the vibration waveform similar to the knock waveform model is obtained but there is $\Delta S(I)$ greater than threshold value $\Delta S(0)$ (YES in S202) in the number equal to or smaller than "3" (YES in S300), it is considered that the obtained vibration waveform may include the vibration due to the noise.

In particular, when the number of $\Delta S(I)$ greater than threshold value $\Delta S(0)$ is equal to or smaller than "2" (YES in S302), it is considered that the obtained vibration waveform including the vibration due to the noise with a high possibility.

In this case, even if the obtained vibration waveform is simply compared with the knock waveform model as it is, it may be erroneously determined that no knocking occurs irrespective of the occurrence of the knocking because great $\Delta S(I)$ is present.

Figure 21:
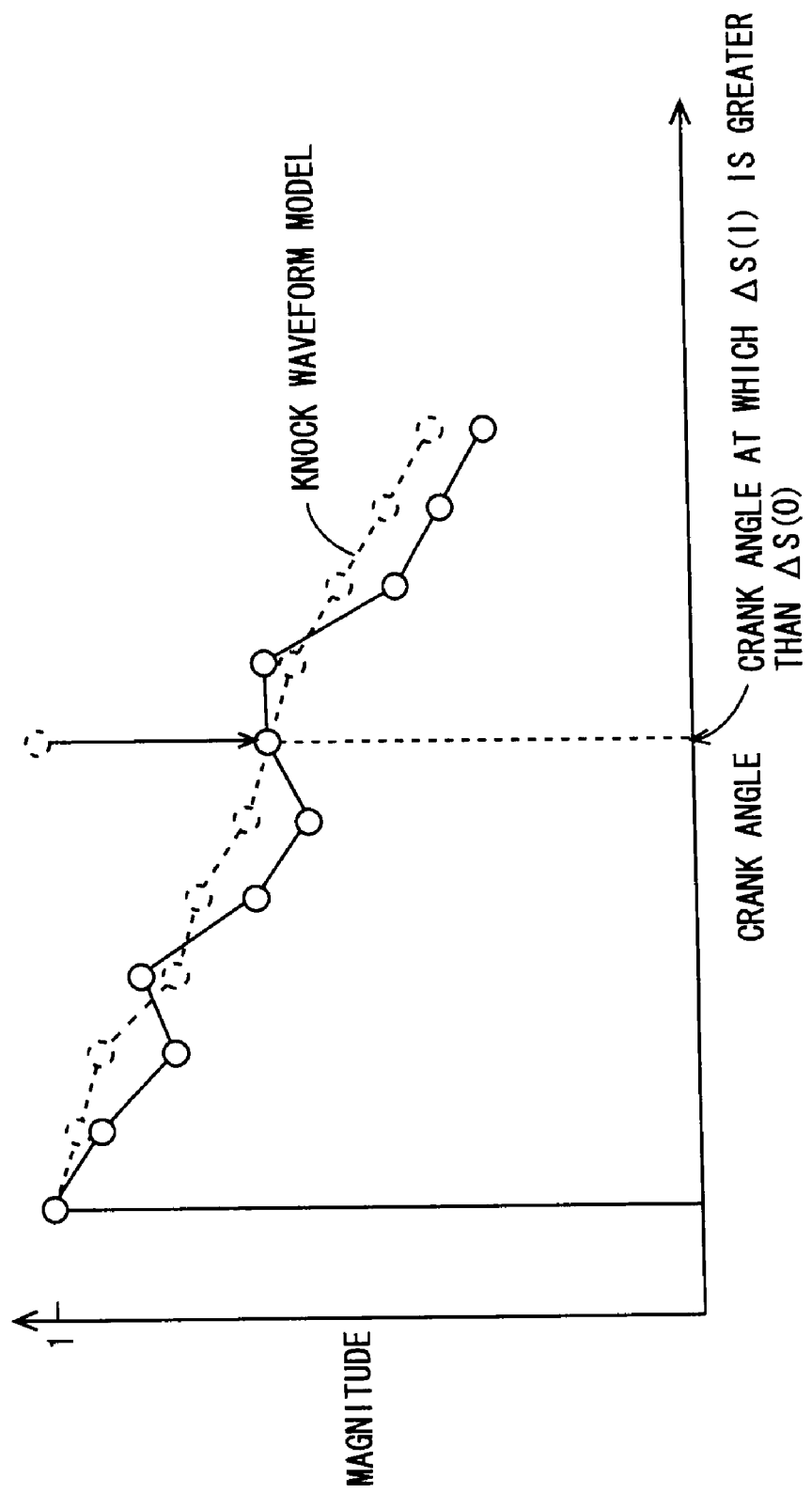
FIG. 21 is a graph (No. 4) showing the vibration waveform in fourth frequency band D with the knock waveform model in comparison.

Then, as shown in FIG. 21, the vibration waveform is corrected such that the magnitude accords with the magnitude of knock waveform model at the crank angle, at which $\Delta S(I)$ is greater than threshold value $\Delta S(0)$ (S304).

Thus, it is possible to lessen adverse influence by the vibration due to the noise included in the vibration waveform. As a result, is possible to lessen erroneous determination that the knocking occurs irrespective of the occurrence of the knocking.

Figure 22:
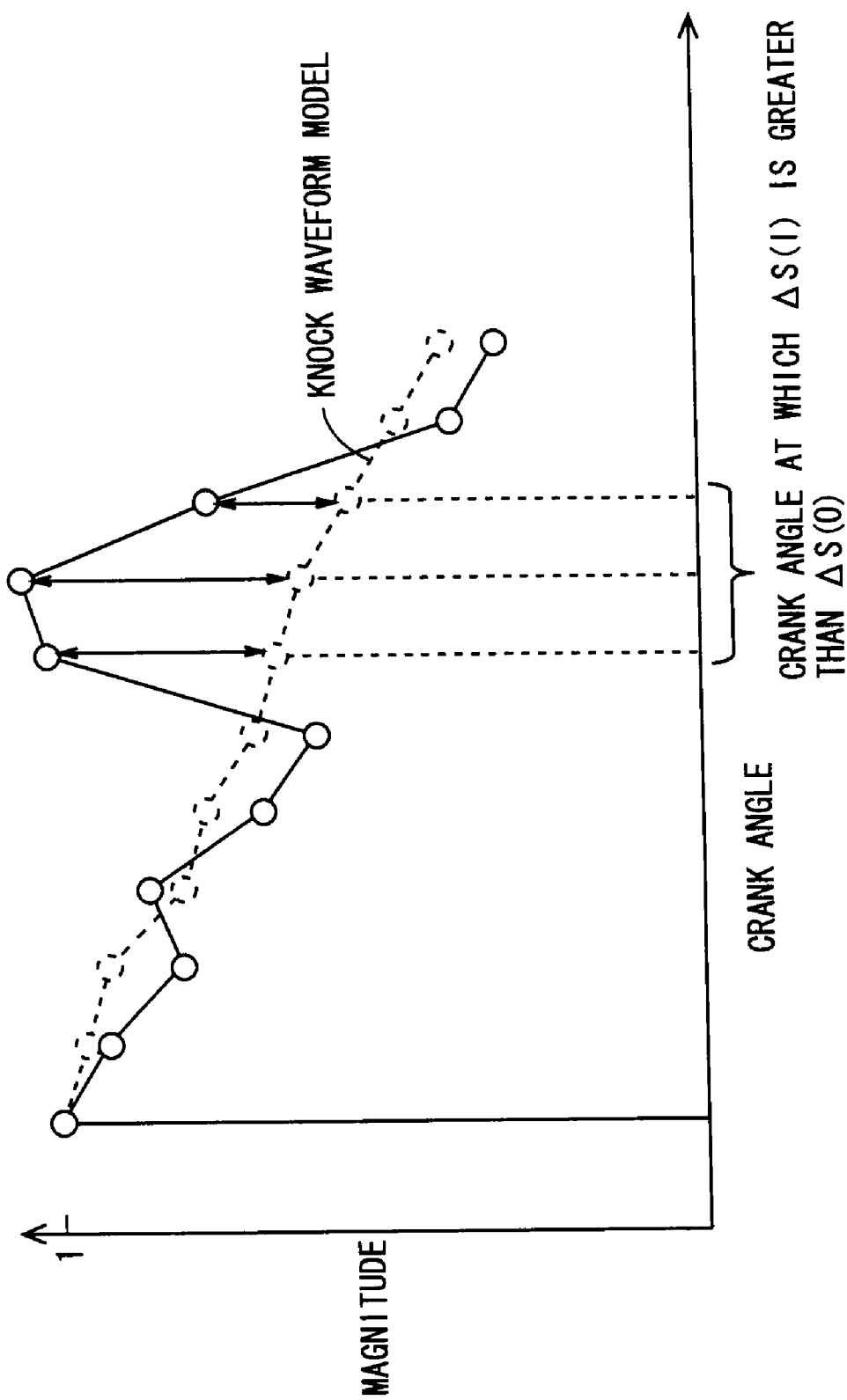
FIG. 22 is a graph (No. 5) showing the vibration waveform in fourth frequency band D with the knock waveform model in comparison.

On the other hand, when the number of $\Delta S(I)$ greater than threshold value $\Delta S(0)$ is equal to or smaller than "3" (YES in S300) and more than "2" (NO in S302), the obtained vibration waveform may or may not include the vibration due to the noise, as shown in FIG. 22.

Figure 23:
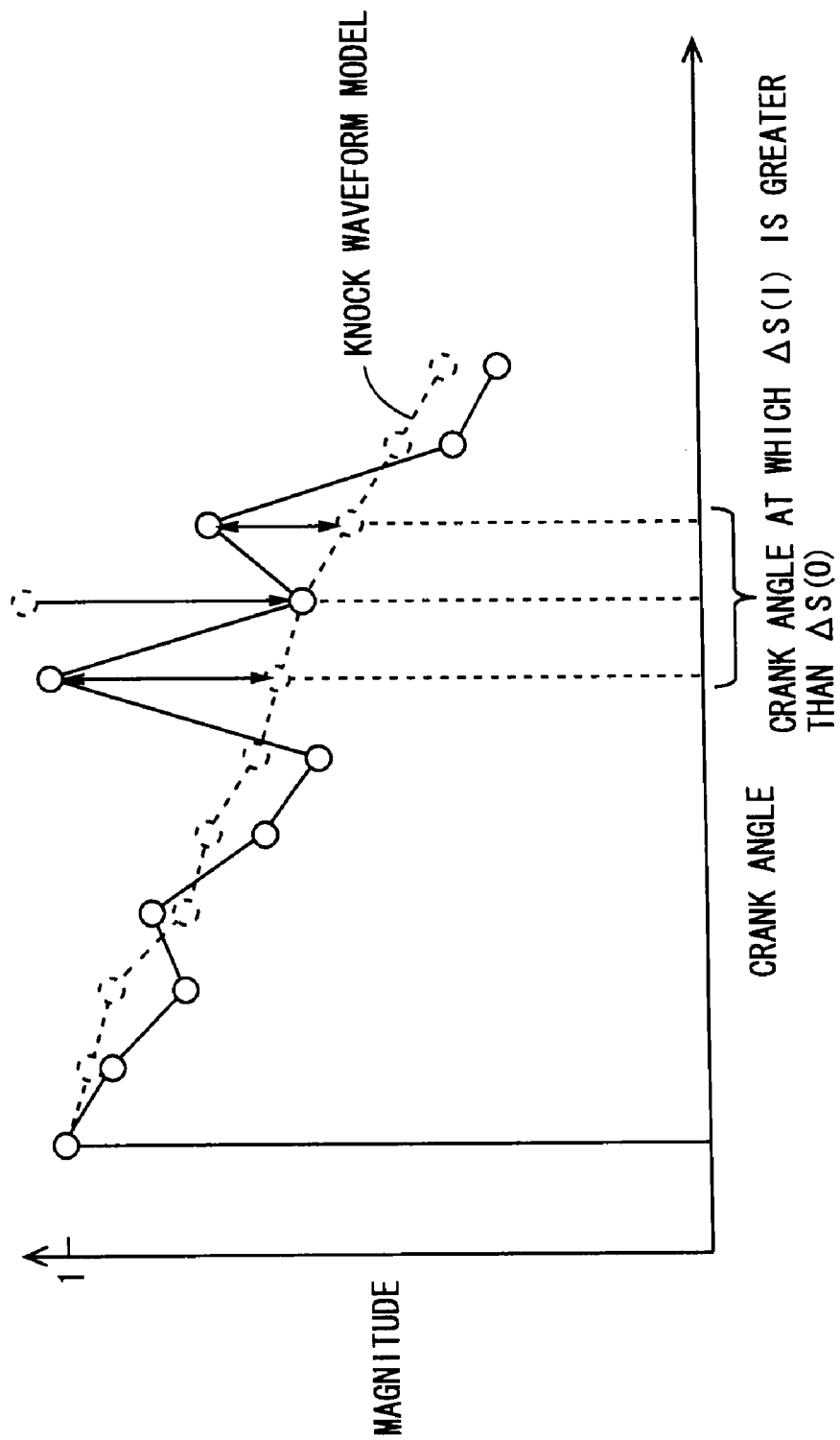
FIG. 23 is a graph (No. 6) showing the vibration waveform in fourth frequency band D with the knock waveform model in comparison.

When the vibration waveform is corrected in such a case, it may be erroneously determined that the knocking occurs irrespective of no occurrence of knocking. In view of this, in this case, as shown in FIG. 23, the vibration waveform is corrected such that the magnitude accords with the magnitude of the knock waveform model at "one" crank angle while placing a higher priority on crank angles having greater ΔS(I) out of the crank angles at which ΔS(I) is greater than threshold value ΔS(0) (S306). Thus, it is possible to suppress the correction of the vibration waveform more than necessary. As a consequence, it is possible to suppress any erroneous determination that the knocking occurs irrespective of no occurrence of the knocking.

The corrected crank angle and its correction amount γ are stored in SRAM 204 (S308). The corrected vibration waveform and the knock waveform model are compared with each other, and thus, correlation coefficient K is calculated (S310).

Figure 24:
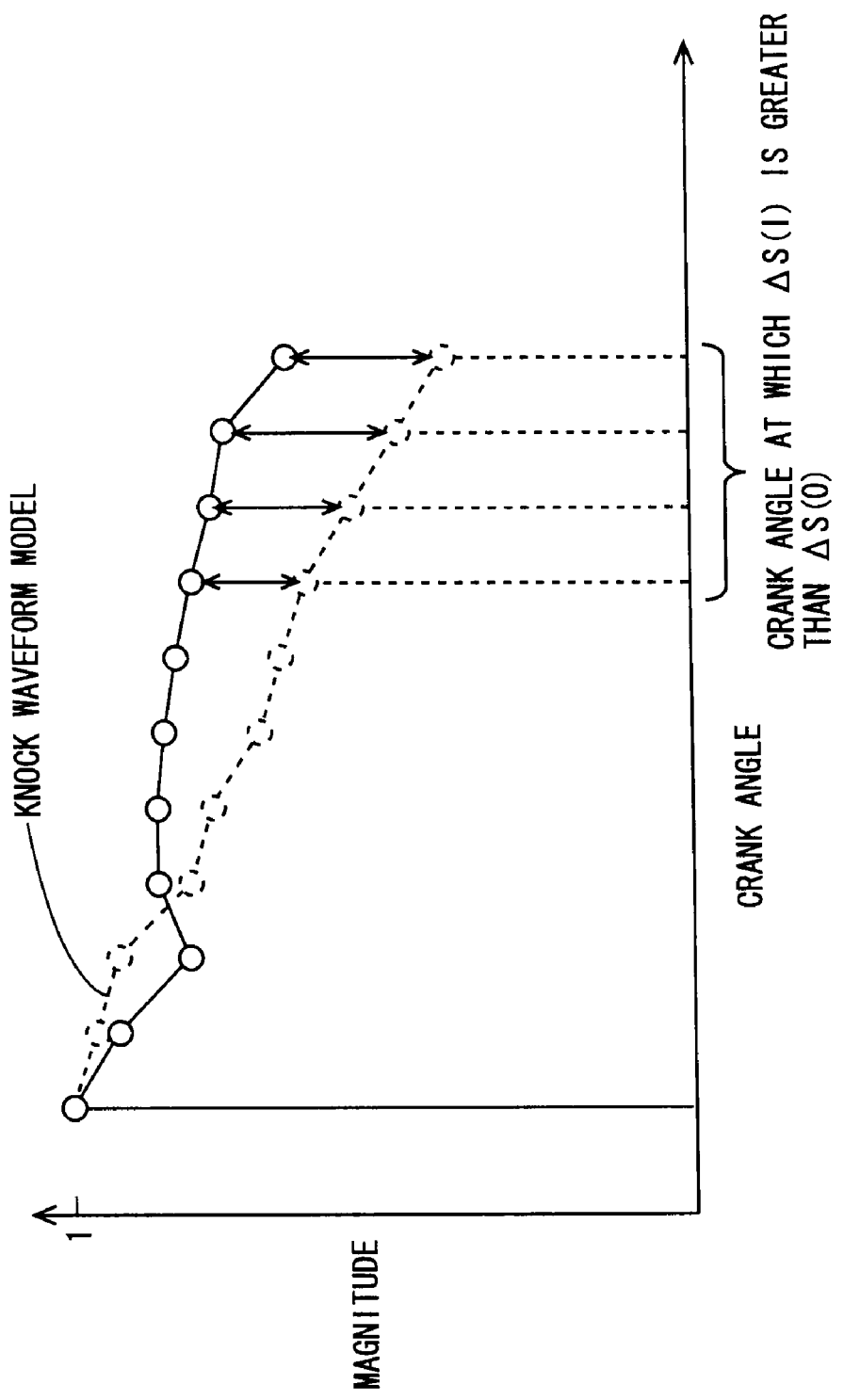
FIG. 24 is a graph (No. 7) showing the vibration waveform in fourth frequency band D with the knock waveform model in comparison.

As shown in FIG. 24, since a vibration waveform that is greatly different from the knock waveform model is obtained, when there is ΔS(I) greater than threshold value ΔS(0) (NO in S202) and the number is "4" (more than "3") (NO in S300), the obtained vibration waveform does not include the vibration due to the noise with a high possibility.

As a consequence, without correcting the vibration waveform, the obtained vibration waveform and the knock waveform model are compared with each other, and then, correlation coefficient K is calculated (S312). Thus, it is possible to lessen erroneous determination that the knocking occurs irrespective of no occurrence of the knocking.

Thereafter, unless the occurrence of the knocking is temporarily determined (NO in S400), that is, if it is determined that no knocking occurs, knock magnitude N is not calculated but the control routine comes to an end. In other words, the calculated correlation coefficient K is used only for creating the above-described frequency distribution (see FIG. 14). Thus, it is possible to suppress any unnecessary processing.

In contrast, if the occurrence of the knocking is temporarily determined (YES in S400), knock magnitude N is calculated. The integrated values in the synthesized waveform of first to third frequency bands A to C are used in calculating knock magnitude N.

Figure 25:
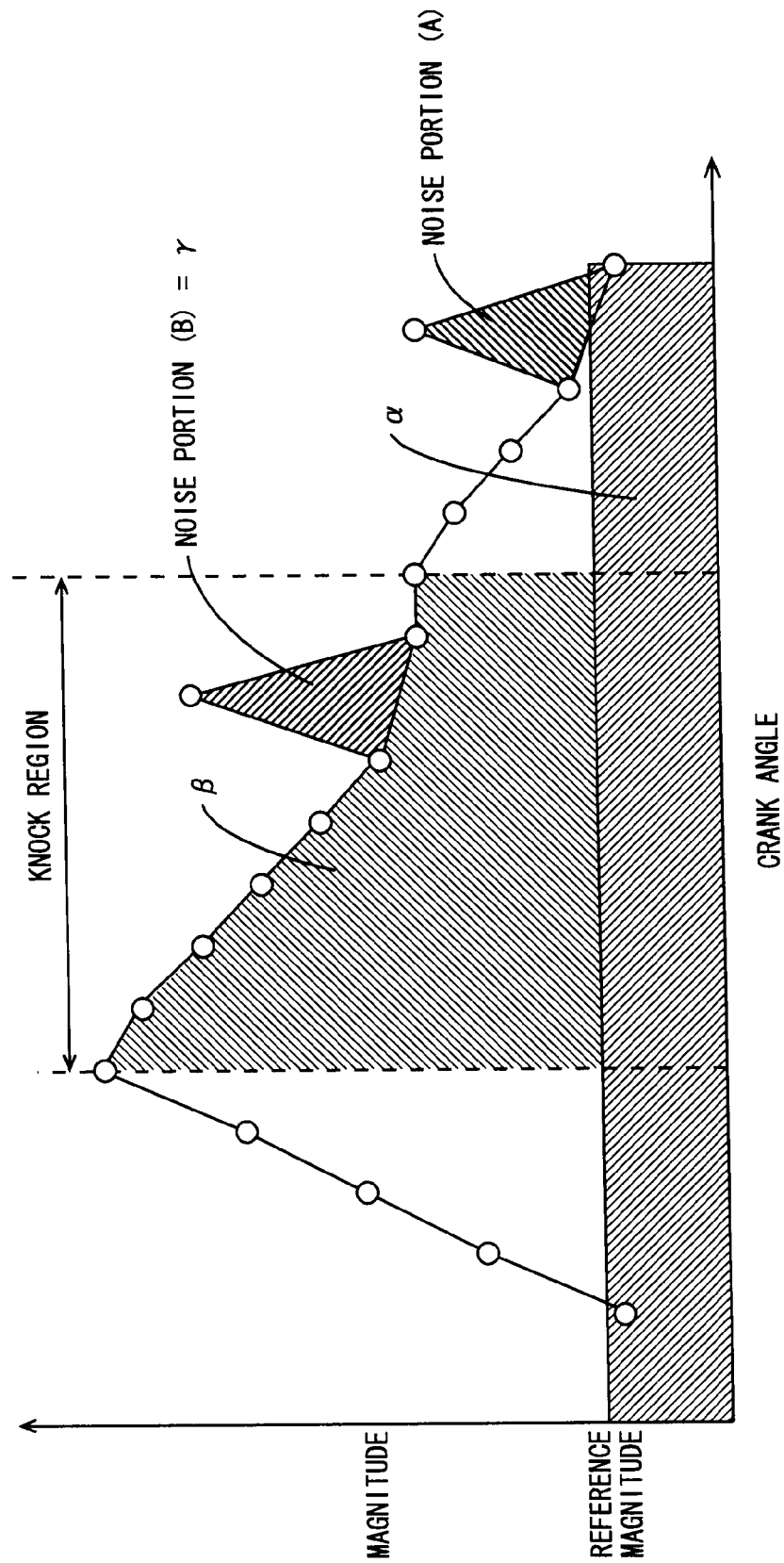
FIG. 25 is a graph (No. 2) showing the synthesized waveform of first frequency band A to third frequency band C for use in calculating knock magnitude N.

As shown in FIG. 25, a noise portion (A) and a noise portion (B) corresponding to the vibration due to the noise may exist in mixture even in the synthesized waveform of first to third frequency bands A to C. In order to eliminate these noise portions, knock magnitude N is calculated as N=(α+(β−γ)×K)/α by using value α obtained by summing (i.e., integrating) the reference magnitudes at the crank angles by 90°, a portion β at which the integrated value is greater than the reference magnitude in the knock region, and correction amount γ (S500).

Specifically, portion β having the integrated value greater than the reference magnitude is used in the knock region, in which the magnitude of vibration caused by the knocking is great: in contrast, knock magnitude N is calculated without using the value having the integrated value greater than the reference magnitude in a region out of the knock region (i.e., a region obtained by excluding the knock region from the knock detecting gate and being smaller in magnitude of vibration caused by the knocking than the knock region). In this way, it is possible to eliminate noise portion (A) out of the knock region shown in FIG. 25. As a consequence, it is possible to remove the integrated value to be attributed to the noise resulting from the calculation of the great integrated value in a region in which the magnitude of the vibration caused by the knocking is small.

Knock magnitude N is calculated by subtracting correction amount γ from portion β having the integrated value greater than the reference magnitude in the knock region. In this way, it is possible to eliminate noise portion (B) out of the knock region shown in FIG. 25. As a consequence, it is possible to remove the integrated value to be attributed to the noise from the waveform in the region in which the magnitude of the vibration caused by the knocking is great.

When knock magnitude N such calculated as described above is greater than determination value V(KX) (YES in S502), it is determined that the knocking occurs (S504), and then, the ignition timing is retarded (S506). Thus, it is possible to suppress the occurrence of the knocking.

In contrast, when knock magnitude N is not greater than determination value V(KX) (NO in S502), it is determined that no knocking occurs (S508), and then, the ignition timing is advanced (S510). In this manner, it is determined whether the knocking occurs every ignition cycle in comparison between knock magnitude N and determination value V(KX), thus retarding or advancing the ignition timing.

As described above, with the engine ECU serving as the knocking determination device in the present preferred embodiment, knock magnitude N is calculated except for the portion having the integrated value greater than the reference magnitude out of the knock region. As a consequence, it is possible to remove the integrated value to be attributed to the noise resulting from the calculation of the great integrated value in the region in which the magnitude of vibration caused by the knocking is small. Based on knock magnitude N, it is determined whether the knocking occurs. Thus, it is possible to lessen erroneous determination that no knocking occurs irrespective of the occurrence of the knocking or that the knocking occurs irrespective of no occurrence of the knocking.

It is to be understood that the preferred embodiment described herein should be illustrative but should not be restrictive in all points. The present invention falls in not the above description but the scope of the claims, and further, is intended to encompass all alterations and modifications within the scope and spirit equivalent to those of the claims.

The invention claimed is:

1. A knocking determination device for an internal combustion engine, comprising:
    a crank position sensor which detects a crank angle of said internal combustion engine;
    a knock sensor which detects a magnitude of vibration in said internal combustion engine corresponding to the crank angle; and
    an operation unit, wherein
    said operation unit detects waveforms of vibrations at a predetermined first interval with respect to the crank angle and a second interval, at which the magnitude of vibration caused by knocking is smaller than that at said first interval, based on the magnitude of vibration in said internal combustion engine,
    removes a noise portion with a magnitude greater than a predetermined reference magnitude from the waveform at said second interval, and
    determines whether knocking occurs based on the waveform at said second interval, from which said noise portion is removed, and the waveform at said first interval.

2. The knocking determination device for an internal combustion engine according to claim 1, wherein said reference magnitude is a value which is calculated based on a predetermined number of magnitudes selected by priority of smaller ones out of the detected magnitudes.

3. The knocking determination device for an internal combustion engine according to claim 2, wherein said reference magnitude is a value which is calculated as an average of the predetermined number of magnitudes selected by priority of smaller ones out of the detected magnitudes.

4. The knocking determination device for an internal combustion engine according to claim 1, wherein
said operation unit determines whether there is a magnitude greater than a threshold calculated based on said reference magnitude, and then,
determines whether the knocking occurs in a case where it is determined that there is a magnitude greater than said threshold.

5. The knocking determination device for an internal combustion engine according to claim 4, wherein said reference magnitude is calculated when it is determined whether there is a magnitude greater than said threshold.

6. The knocking determination device for an internal combustion engine according to claim 1, wherein the operation unit determines the noise portion based on the detected waveform and a predetermined knock waveform model.

7. A knocking determination method for an internal combustion engine, comprising:
detecting a crank angle of said internal combustion engine;
detecting a magnitude of vibration in said internal combustion engine in such a manner as to correspond to the crank angle;
detecting waveforms of vibrations at a predetermined first interval with respect to the crank angle and a second interval, at which the magnitude of vibration caused by knocking is smaller than that at said first interval, based on the magnitude of vibration in said internal combustion engine;
removing a noise portion with a magnitude greater than a predetermined reference magnitude from the waveform at said second interval; and
determining whether knocking occurs based on the waveform at said second interval, from which said noise portion is removed, and the waveform at said first interval.

8. The knocking determination method for an internal combustion engine according to claim 7, wherein said reference magnitude is a value which is calculated based on a predetermined number of magnitudes selected by priority of smaller ones out of the detected magnitudes.

9. The knocking determination device for an internal combustion engine according to claim 8, wherein said reference magnitude is a value which is calculated as an average of the predetermined number of magnitudes selected by priority of smaller ones out of the detected magnitudes.

10. The knocking determination device for an internal combustion engine according to claim 7, further comprising the step of determining whether there is a magnitude greater than a threshold calculated based on said reference magnitude, wherein
the step of determining whether the knocking occurs includes the step of determining whether the knocking occurs in a case where it is determined that there is a magnitude greater than said threshold.

11. The knocking determination device for an internal combustion engine according to claim 10, wherein said reference magnitude is calculated when it is determined whether there is a magnitude greater than said threshold.

12. A knocking determination device for an internal combustion engine, comprising:
crank angle detecting means for detecting a crank angle of said internal combustion engine;
magnitude detecting means for detecting a magnitude of vibration in said internal combustion engine in such a manner as to correspond to the crank angle;
waveform detecting means for detecting waveforms of vibrations at a predetermined first interval with respect to the crank angle and a second interval, at which the magnitude of vibration caused by knocking is smaller than that at said first interval, based on the magnitude of vibration in said internal combustion engine;
removing means for removing a noise portion with a magnitude greater than a predetermined reference magnitude from the waveform at said second interval; and
determining means for determining whether knocking occurs based on the waveform at said second interval, from which said noise portion is removed, and the waveform at said first interval.

13. The knocking determination device for an internal combustion engine according to claim 12, wherein said reference magnitude is a value which is calculated based on a predetermined number of magnitudes selected by priority of smaller ones out of the detected magnitudes.

14. The knocking determination device for an internal combustion engine according to claim 13, wherein said reference magnitude is a value which is calculated as an average of the predetermined number of magnitudes selected by priority of smaller ones out of the detected magnitudes.

15. The knocking determination device for an internal combustion engine according to claim 12, further comprising magnitude determining means for determining whether there is a magnitude greater than a threshold calculated based on said reference magnitude, wherein
said determining means includes means for determining whether the knocking occurs in a case where it is determined that there is a magnitude greater than said threshold.

16. The knocking determination device for an internal combustion engine according to claim 15, wherein said reference magnitude is calculated at a time of the determination by said magnitude determining means.

* * * * *